(12) United States Patent
Xiao et al.

(10) Patent No.: US 9,408,121 B2
(45) Date of Patent: Aug. 2, 2016

(54) METHOD AND APPARATUS FOR ENHANCING MEASUREMENT IN WIRELESS COMMUNICATION SYSTEM

(71) Applicant: Huawei Technologies Co., Ltd., Shenzhen, Guangdong (CN)

(72) Inventors: Dengkun Xiao, Beijing (CN); Jing Han, Beijing (CN); Anjian Li, Beijing (CN); Yuan He, Shenzhen (CN); Tong Wu, Shenzhen (CN); Jie Cui, Beijing (CN); Liji Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 14/336,789

(22) Filed: Jul. 21, 2014

(65) Prior Publication Data

US 2014/0328327 A1    Nov. 6, 2014

Related U.S. Application Data

(63) Continuation of application No. PCT/CN2013/070770, filed on Jan. 21, 2013.

(30) Foreign Application Priority Data

Jan. 21, 2012 (CN) .......................... 2012 1 0019734

(51) Int. Cl.
  *H04W 36/00*  (2009.01)
  *H04W 48/20*  (2009.01)
  (Continued)

(52) U.S. Cl.
  CPC ........... *H04W 36/0088* (2013.01); *H04L 5/001* (2013.01); *H04L 5/0048* (2013.01); *H04L 5/0073* (2013.01); *H04W 36/30* (2013.01); *H04W 48/20* (2013.01)

(58) Field of Classification Search
  None
  See application file for complete search history.

(56) References Cited

U.S. PATENT DOCUMENTS

2007/0121552 A1\* 5/2007 Lindoff ................ H04B 17/336
                                                                          370/333
2008/0107163 A1   5/2008 Goransson
(Continued)

FOREIGN PATENT DOCUMENTS

CN    101064920 A    10/2007
CN    101075830 A    11/2007
(Continued)

OTHER PUBLICATIONS

"3rd Generation Partnership Project; Technical Specification Group Radio Access Network; Evolved Universal Terrestrial Radio Access (E-UTRA); Requirements for support of radio resource management (Release 10)", 3GPP TS 36.133 V10.5.0, Dec. 2011, 544 pages.

(Continued)

*Primary Examiner* — Andrew Lai
*Assistant Examiner* — Jamaal Henson

(57) ABSTRACT

Embodiments of the present invention provide a method and an apparatus for enhancing measurement in a wireless communication system. The method includes: obtaining, according to a measurement period or triggered by an event, a measurement amount, where the measurement amount includes a ratio of a valid signal based on a reference signal to a non-valid signal based on the reference signal measured based on the reference signal; reporting the measurement amount to a base station; or performing cell selection or cell reselection according to the measurement amount.

20 Claims, 12 Drawing Sheets

A UE obtains, according to a measurement period or triggered by an event, a measurement amount — 11

The UE reports the measurement amount to a base station; or performs cell selection or cell reselection according to the measurement amount — 12

(51) Int. Cl.
  *H04W 36/30* (2009.01)
  *H04L 5/00* (2006.01)

(56) References Cited

U.S. PATENT DOCUMENTS

| | | | | |
|---|---|---|---|---|
| 2008/0167047 | A1* | 7/2008 | Abedi | H04W 36/18 455/442 |
| 2009/0286482 | A1* | 11/2009 | Gorokhov | H04B 7/0617 455/63.1 |
| 2010/0208604 | A1* | 8/2010 | Kazmi | H04W 36/24 370/252 |
| 2011/0085460 | A1* | 4/2011 | Zhang | H04W 56/005 370/252 |
| 2011/0110254 | A1* | 5/2011 | Ji | H04W 36/0066 370/252 |

FOREIGN PATENT DOCUMENTS

| | | |
|---|---|---|
| CN | 101291162 A | 10/2008 |
| WO | WO 2011/057037 A2 | 5/2011 |
| WO | WO 2011/123974 A1 | 10/2011 |

OTHER PUBLICATIONS

"3rd Generation Partnership Project; Technical Specification Group Radio Access Network; Evolved Universal Terrestrial Radio Access (E-UTRA); Physical Channels and Modulation (Release 10)", 3GPP TS 36.211 V10.4.0, Dec. 2011, 101 pages.

"3rd Generation Partnership Project; Technical Specification Group Radio Access Network; Evolved Universal Terrestrial Radio Access (E-UTRA); Physical layer; Measurements (Release 10)", 3GPP TS 36.214 V10.1.0, Mar. 2011, 13 pages.

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.4.0, Dec. 2011, 296 pages.

"Discussion on measurement bandwidth", Huawei, HiSilicon, 3GPP TSG-RAN WG4 Meeting #61, Nov. 14-18, 2011, 3 pages.

"Analysis of Wider Measurement BW for RSRQ", Ericsson, ST-Ericsson, TSG-RAN Working Group 4 (Radio) meeting #61, Nov. 14-18, 2011, 3 pages.

"Discussion of RSRQ Measurement Bandwidth", Alcatel-Lucent, 3GPP TSG-RAN WG4 Meeting #60bis, Oct. 10-14, 2011, 3 pages.

"3rd Generation Partnership Project; Technical Specification Group Radio Access Network; Evolved Universal Terrestrial Radio Access (E-UTRA); Physical layer; Measurements (Release 9)", 3GPP TS 36.214 V9.2.0, Jun. 2010, 14 pages.

"Issues on narrow measurement bandwidth", NTT DOCOMO, TSG-RAN Working Group 4 Meeting #60, Aug. 22-26, 2011, 5 pages.

"3rd Generation Partnership Project; Technical Specification Group Radio Access Network; Evolved Universal Terrestrial Radio Access (E-UTRA); User Equipment (UE) procedures in idle mode (Release 10)", 3GPP TS 36.304 V10.4.0, Dec. 2011, 33 pages.

* cited by examiner

METHOD AND APPARATUS FOR ENHANCING MEASUREMENT IN WIRELESS COMMUNICATION SYSTEM

CROSS-REFERENCE TO RELATED APPLICATIONS

This application is a continuation of International Application No. PCT/CN2013/070770, filed on Jan. 21, 2013, which claims priority to Chinese Patent Application No. 201210019734.5, filed on Jan. 21, 2012, both of which are hereby incorporated by reference in their entireties.

TECHNICAL FIELD

Embodiments of the present invention relate to the field of communications technologies, and more specifically, to a method and an apparatus for enhancing measurement in a wireless communication system.

BACKGROUND

In current protocols of a long term evaluate (Long Term Evaluate, LTE) network, for example, an eighth version or a ninth version (Rel-8/9), an adopted measurement amount is a reference signal received power (Reference Signal Received Power, RSRP) and reference signal received quality (Reference Signal Received Quality, RSRQ), where RSRP reflects an received signal strength, RSRQ reflects channel quality, and the measurement amount is relevant to loads of the cell and neighboring cells. After an event is satisfied, a user equipment (User Equipment, UE) reports the measurement amount RSRP or RSRQ to a base station (for example, an evolved Node B (evolved Node B, eNB)). Alternatively, the UE periodically reports the measurement amount RSRP or RSRQ to the eNB. Therefore, the eNB performs, according to the measurement amount reported by the UE, cell handover (Handover, HO) decision or inter-cell interference coordination.

Currently, a regulation for a measurement bandwidth of RSRP or RSRQ is embodied in a system message SIB3, SIB5, and radio resource control (Radio Resource Control, RRC) signaling, for example, is usually indicated by adopting an information element "allowedmeasbandwidth" (the maximum allowed bandwidth). In other words, the UE may measure a bandwidth smaller than allowedmeasbandwidth. However, the UE only reports the measurement amount RSRP or RSRQ, so that a network side cannot know the measurement bandwidth adopted by the UE.

Currently, using the measurement amount RSRP or RSRQ in a radio resource management (Radio Resource Management, RRM) algorithm (for example, inter-cell interference coordination (inter-cell interference coordination, ICIC) algorithm) may result in mis-determination of the base station or incapability of realizing anticipated effects.

In addition, in a new type network (for example, special network deployment, heterogeneous networks (Heterogeneous Networks, het-net), coordinated multiple points transmission and reception (Coordinated Multiple Points transmission and reception, CoMP)), the measurement amount RSRP or RSRQ cannot bring a better effect of the cell handover decision or the inter-cell interference coordination either.

SUMMARY

Embodiments of the present invention provide a method and an apparatus for enhancing measurement in a wireless communication system, where through a newly added measurement amount, a UE is assisted in performing cell selection and cell reselection, or a base station is assisted in performing cell handover decision and inter-cell interference coordination, thereby improving network communication performance.

In one aspect, a method for enhancing measurement in a wireless communication system is provided, including: obtaining, according to a measurement period or triggered by an event, a measurement amount, where the measurement amount includes a ratio of a valid signal based on a reference signal to a non-valid signal based on the reference signal measured based on the reference signal; and reporting the measurement amount to a base station; or performing cell selection or cell reselection according to the measurement amount.

In another aspect, a method for enhancing measurement in a wireless communication system is provided, including: receiving a measurement amount reported by a UE, where the measurement amount includes a ratio of a valid signal based on a reference signal to a non-valid signal based on the reference signal measured based on the reference signal; and performing inter-cell interference coordination or cell handover decision according to the measurement amount.

In further another aspect, an apparatus for enhancing measurement in a wireless communication system is provided, including: a measurement unit, configured to obtain, according to a measurement period or triggered by an event, a measurement amount, where the measurement amount includes a ratio of a valid signal based on a reference signal to a non-valid signal based on the reference signal measured based on the reference signal; a first transmission unit, configured to report the measurement amount to a base station; and a mobility execution unit, configured to perform cell selection or cell reselection according to the measurement amount.

In still further another aspect, an apparatus for enhancing measurement in a wireless communication system is provided, including: a second transmission unit, configured to receive a measurement amount reported by a UE, where the measurement amount includes a ratio of a valid signal based on a reference signal to a non-valid signal based on the reference signal measured based on the reference signal; and a decision unit, configured to perform inter-cell interference coordination or cell handover decision according to the measurement amount.

In the embodiments of the present invention, through introducing the newly added measurement amount, a downlink ICIC throughput is improved, a UE handover success rate is improved, and a system throughput is increased.

In addition, through regulations for a measurement bandwidth and a measurement frequency range, in a scenario newly deployed by an operator, sufficient and accurate measurement information may be provided for the base station, so as to assist the base station in performing the handover decision and the interference coordination.

Further, in a CoMP scenario, a channel-state information reference signal (Channel-State Information reference signals, CSI-RS) is used for RRM measurement, and a measurement period satisfies an accuracy demand and system performance in consideration of power consumption of the user; for RRM measurement on cell-specific reference signals (Cell-specific reference signals, CRS), the power consumption of the UE may be saved, and system performance, for example, a handover failure rate and the like, is improved.

BRIEF DESCRIPTION OF THE DRAWINGS

To illustrate the technical solutions according to the embodiments of the present invention more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION

The technical solutions according to the embodiments of the present invention will be clearly described below with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

The technical solutions of the present invention are applicable to various communication systems, for example, GSM, a code division multiple access (CDMA, Code Division Multiple Access) system, wideband code division multiple access (WCDMA, Wideband Code Division Multiple Access), a general packet radio service (GPRS, General Packet Radio Service), LTE, and the like.

A UE (User Equipment), also called a mobile terminal (Mobile Terminal), a mobile user equipment, and the like, may communicate with one or more core networks through a radio access network (for example, RAN, Radio Access Network). The user equipment may be a mobile terminal, for example, a mobile phone (or called a "cellular" phone) and a computer having a mobile terminal, for example, may be a portable, pocket, hand-held, computer built-in, or on-board mobile apparatus, which exchanges language and/or data with the radio access network.

The base station may be a base station (BTS, Base Transceiver Station) in the GSM or the CDMA, or may also be a base station (NodeB) in the WCDMA, or may further be an evolved base station (eNB or e-NodeB, evolutional Node B) in the LTE, which is not limited in the present invention, but for ease of description, Node B is taken as an example for illustration in the following embodiments.

In the following, an LTE network is taken as an example for illustrating the embodiments of the present invention.

Figure 1:
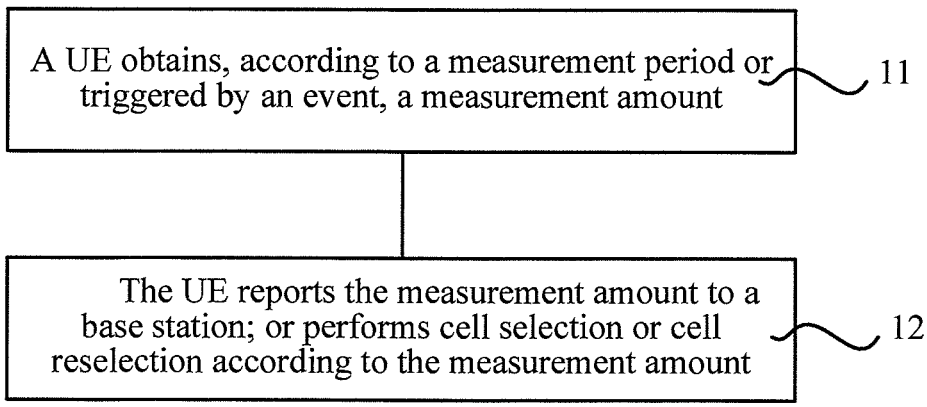
FIG. 1 is a flowchart of a method for enhancing measurement in a wireless communication system (UE side) according to an embodiment of the present invention.

In the following, in combination with a flowchart of FIG. 1, a method for enhancing measurement in a wireless communication system (UE side) according to an embodiment of the present invention is illustrated.

11: A UE obtains, according to a measurement period or triggered by an event, a measurement amount, where the measurement amount includes a ratio of a valid signal based on a reference signal to a non-valid signal based on the reference signal measured based on the reference signal, for example, a signal to interference plus noise ratio SINR (Signal to Interference plus Noise Ratio) or a signal to noise ratio SNR (Signal to Noise Ratio) measured based on the reference signal.

The reference signal may be a cell-specific reference signal (Cell-specific reference signals, CRS), a channel-state information reference signal (Channel-State Information reference signals, CSI-RS), or a positioning reference signal (Positioning reference signals, PRS).

In an existing protocol, usually adopted measurement amounts are an RSRP and RSRQ, but in the embodiment of the present invention, a new measurement amount SINR or SNR is introduced, for example, the new measurement amount is a signal to interference plus noise ratio $$SINR = \frac{S}{INTF + \text{NOISE}}$$

or a signal to noise ratio $$SNR = \frac{S}{\text{NOISE}}$$

measured based on the reference signal, where S is a valid signal based on the reference signal, INTF is an interference signal based on the reference signal, and NOISE is a noise signal based on the reference signal.

The signal to interference plus noise ratio $$SINR = \frac{S}{INTF + \text{NOISE}}$$

measured based on the reference signal is taken as an example, a signal to interference plus noise ratio measured on a resource element RE including the reference signal is $$SINR = \frac{RSRP}{Intf_1 + noise_1};$$

or a signal to interference plus noise ratio measured on an orthogonal frequency division multiplexing OFDM symbol including the reference signal is $$SINR = \frac{RSRP}{Intf_2 + noise_2};$$

or a signal to interference plus noise ratio measured on a resource block RB including the reference signal in a measurement bandwidth is $$SINR = \frac{N * RSRP}{\sum_{RB=1}^{N} Intf_3 + noise_3};$$

where RSRP is a valid signal on the RE including the reference signal, Intf1 is an interference signal on the RE including the reference signal, noise1 is a noise signal on the RE including the reference signal, Intf2 is an interference signal received on the OFDM symbol including the reference signal in the measurement bandwidth, noise2 is a noise signal received on the OFDM symbol including the reference signal in the measurement bandwidth, Intf3 is an interference signal received on the resource block including the reference signal in the measurement bandwidth, noise3 is a noise signal received on the resource block including the reference signal in the measurement bandwidth, and N is the number of resource blocks occupied by the measurement bandwidth.

Generally, the UE also reports a channel quality indicator (Channel Quality Indicator, CQI) which is used as a measurement amount, but the CQI is a quantized result, and cannot completely directly reflect the SINR of the UE. Therefore, a channel quality index signal to interference plus noise ratio CQI SINR based on the CRS or the CSI-RS is measured, where the CQI SINR is used to indicate channel quality. Calculation of the CQI SINR is relevant to a transmission mode, a precoding manner, layer mapping (layer mapping), and a receiver algorithm.

12: In a connected state, the UE reports the measurement amount to a base station; or in an idle state, the UE performs cell selection or cell reselection according to the measurement amount.

The UE establishes communication with the base station, and after being triggered by an event or a period corresponding to the measurement, the UE is in a connected state, and sends a message carrying the newly added measurement amount to the base station.

Alternatively, before the measurement amount is obtained according to the measurement period or triggered by the event, a message carrying the new measurement amount SINR or SNR is sent, according to a message carrying a measurement configuration information element (Information Element, IE) and sent by the base, to the base station. For example, the measurement configuration information element includes one or more pieces of the following information: a reporting configuration information element, a filtering coefficient, a measurement bandwidth, a measurement frequency range, or a measurement period.

When measurement configuration information includes the reporting configuration information element or the filtering coefficient, the UE obtains, according to the reporting configuration information element or the filtering coefficient indicated by the base station, the measurement amount including the newly added measurement amount, and reports the measurement amount including the newly added measurement amount SINR or SNR to the base station.

Optionally, when the measurement configuration includes the measurement bandwidth and/or the measurement frequency range, the UE obtains, according to the measurement period, the measurement amount on the measurement bandwidth and/or the measurement frequency range. Alternatively, when the measurement configuration does not include the measurement bandwidth and the measurement frequency range, the UE selects the measurement bandwidth and/or the measurement frequency range, and obtains, according to the measurement period, the measurement amount on the measurement bandwidth and/or the measurement frequency range. It should be understood that when the UE reports the measurement amount, the measurement bandwidth or a measurement frequency and the measurement amount are bound together and reported to the base station.

It should be noted that the measurement period may be a fixed value configured in the UE, and an appropriate measurement period may also be determined between the UE and the base station according to different network topologies, the reference signal, and the like.

Once reporting the newly added measurement amount to the base station, the UE may wait for receiving a control message sent by the base station, and executes a relevant action according to the control message. For example, when receiving a handover command sent by the base station, the UE performs handover from a serving cell to a target cell according to the handover command.

Through the newly added measurement amount SINR or SNR, the UE in the idle state may be assisted in performing the cell selection or the cell reselection. However, for the UE in the connected state, the UE sends the newly added measurement amount to the base station, so as to assist the base station in performing handover decision and interference coordination, thereby improving network communication performance.

Figure 2:
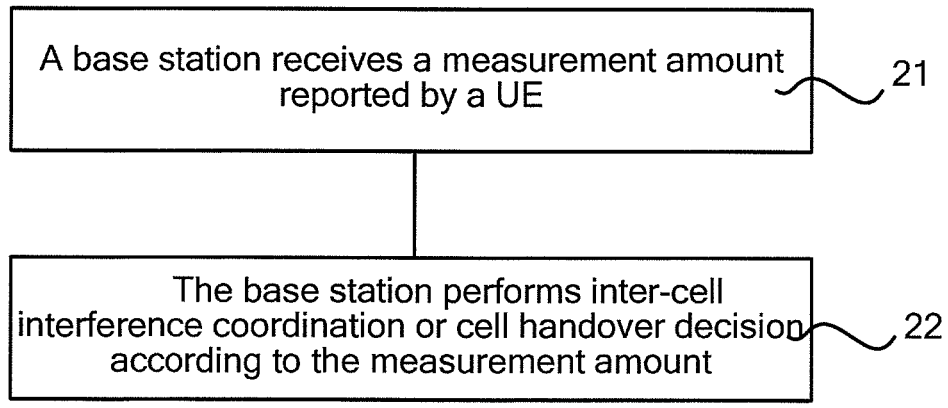
FIG. 2 is a flowchart of a method for enhancing measurement in a wireless communication system (base station side) according to an embodiment of the present invention.

In the following, in combination with a flowchart of FIG. 2, a method for enhancing measurement in a wireless communication system (base station side) according to an embodiment of the present invention is illustrated.

21: A base station receives a measurement amount reported by a UE, where the measurement amount includes a ratio of a valid signal based on a reference signal to a non-valid signal based on the reference signal measured based on the reference signal, for example, a signal to interference plus noise ratio SINR or a signal to noise ratio SNR measured based on the reference signal.

22: The base station performs inter-cell interference coordination or cell handover decision according to the SINR or the SNR.

Specifically, through the newly added measurement amount SINR or SNR, the UE may be assisted in performing cell selection or cell reselection. The UE sends the newly added measurement amount to the base station, so as to assist the base station in performing handover decision and interference coordination, thereby improving network communication performance.

For example, a scenario of a homogeneous network is taken as an example, it is illustrated that for the base station, the measurement amount SINR or SNR is newly added, so as to improve a downlink ICIC throughput.

Specifically, an A3 event in which an RSRP of a serving cell is compared with an RSRP of a neighboring cell (that is, the neighboring cell is an offset better than the serving cell) is usually applied to a downlink ICIC.

If an entry condition of the A3 event is satisfied, it is considered that the UE enters a cell edge; if an exit condition of the A3 event is satisfied, it represents that the UE enters a cell center from the cell edge. However, in a practical scenario, the following situation may occur.

For example, the UE is located at the cell edge, that is, the UE is an edge user. Triggering of the A3 event usually results in comparison between the serving cell and the neighboring cell, so if the A3 event is not triggered, the UE is mis-determined as a center user. For the center user, the base station lowers transmission power. In this manner, for the edge user originally having a heavy interference, the operation that the base station lowers the transmission power inevitably lowers the throughput of the UE.

Further, for example, the UE is located at the cell center, that is, the UE is the center user. However, it is assumed that the UE is located indoor, so a penetration loss is relatively great, so that the received RSRP of the serving cell where the UE is located is relatively small. Similarly, the UE is located at the cell center, so the detected RSRP of the neighboring cell is also relatively small, and the A3 event is not triggered, so that the UE is determined as the center user. The base station lowers the transmission power. In this manner, strength of a signal received by the UE located at the cell center and located indoor is relatively low, so that operation of lowering the transmission power inevitably lowers the throughput of the UE. Here, it is anticipated that the UE is determined as the edge user.

Figure 3:
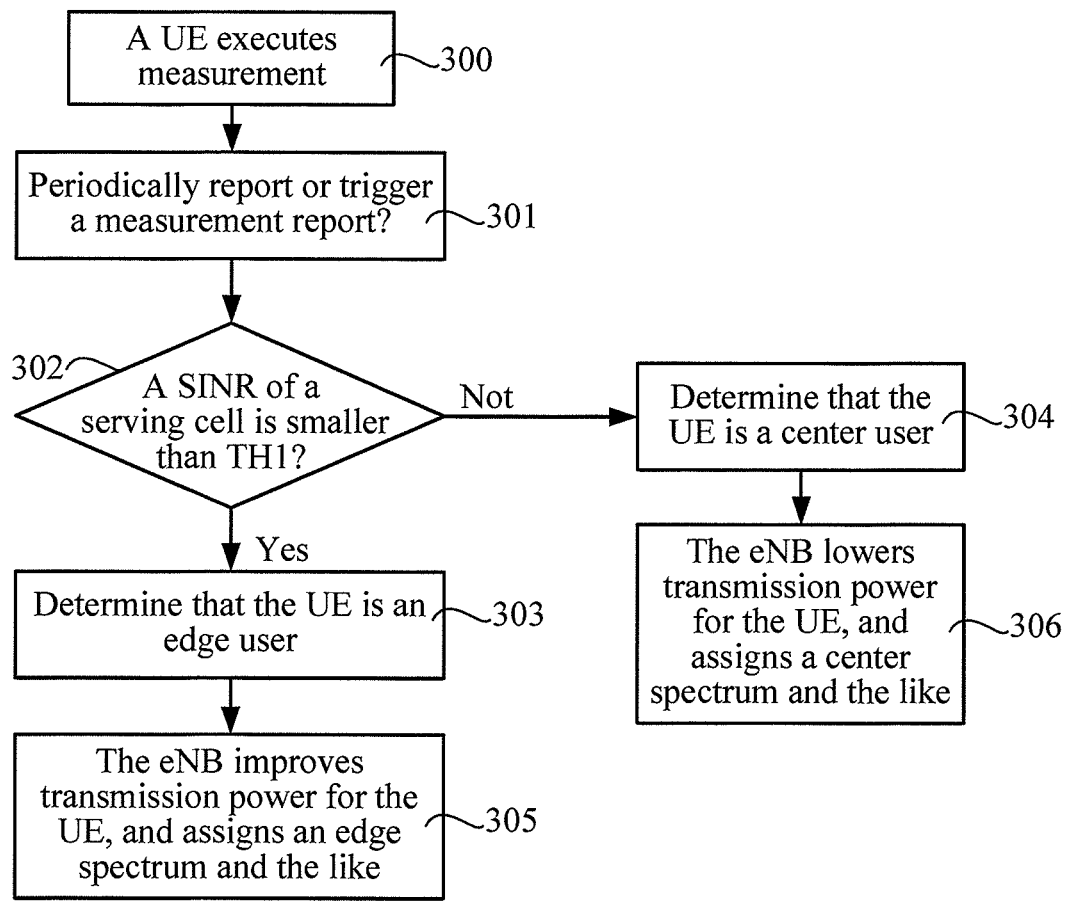
FIG. 3 is a flowchart where a newly added measurement amount assists a base station in performing ICIC according to an embodiment of the present invention.

Therefore, a procedure as shown in FIG. 3 is adopted to assist a base station in performing ICIC.

Step 300: A UE executes measurement, where in addition to a measurement amount RSRP or RSRQ, the UE also measures a newly added measurement amount, for example, SINR or SNR.

Step 301: If a period triggering condition is satisfied, the UE periodically reports the measurement amount SINR or SNR. Alternatively, if an event triggering condition is satisfied, the UE reports the measurement amount SINR or SNR. In addition, the measurement amount RSRP or RSRQ may also be reported.

Step 302: When receiving the measurement amount SINR or SNR reported by the UE, An eNB determines, according to the measurement amount SINR or SNR, whether a measurement amount SINR or SNR of a serving cell measured by the UE is smaller than a preset threshold;

Step 303: If the measurement amount SINR or SNR is smaller than the preset threshold, the eNB determines that the UE is an edge user.

Step 304: If the measurement amount SINR or SNR is greater than or equal to the preset threshold, the eNB determines that the UE is a center user.

Step 305: For the UE being the edge user, the eNB improves transmission power, and assigns a corresponding edge spectrum resource.

Step 306: For the UE being the center user, the eNB lowers transmission power, and assigns a corresponding center spectrum resource.

Because the eNB adopts the newly added measurement amount SINR or SNR when performing the determination, the new measurement amount SINR being the signal to interference plus noise ratio $$SINR = \frac{S}{INTF + \text{NOISE}}$$

is taken as an example, where INTF in the denominator is superposition of interference signals from multiple neighboring cells, NOISE in the denominator is superposition of noise signals from multiple neighboring cells, and S in the numerator is the valid signal from the serving cell.

When the UE is the edge user, because the interference signal is relatively large, the measurement amount SINR is relatively small. If performing the determination according to the measurement amount SINR, the eNB determines the UE as the edge user. For the edge user, the eNB raises the transmission power, so as to increase the throughput of the UE.

When the UE is the center user but is located indoor, the interference signal is relatively small, but the valid signal (for example, the RSRP of the serving cell) received indoor is also quite small, so that from an entire effect, the measurement amount SINR may be relatively small. If performing the determination according to the measurement amount SINR, the eNB determines the UE as the edge user. For the edge user, the eNB raises the transmission power, so as to increase the throughput of the UE.

Similarly, the similar determination may also be performed with the help of the measurement amount SNR.

It may be known that the measurement amount SINR or SNR is helpful for the eNB to perform the ICIC. The procedure that the eNB performs, according to the measurement amount SINR or SNR, the inter-cell interference coordination is that: the base station compares the signal to interference plus noise ratio SINR or the signal to noise ratio SNR of the serving cell with a first threshold (TH1), if the SINR or the SNR is smaller than the first threshold, the base station determines that the UE is the edge user, so as to improve a sending power for the user and/or assign a corresponding cell edge area spectrum resource, if the SINR or the SNR is greater than or equal to the first threshold, the base station determines that the UE is the center user, so as to lower the sending power for the UE and/or assign a corresponding center spectrum resource. For example, the first threshold is used to indicate the area determined to perform the inter-cell interference coordination (ICIC).

When the UE is in the connected state, the UE may report, through RRC signaling, the measurement amount SINR or SNR to the eNB, or may also report, according to a measurement configuration information element carried in the RRC signaling sent by the eNB, through RRC signaling, the measurement amount SINR or SNR to the eNB. Therefore, the newly added measurement amount SINR or SNR may affect the RRC signaling in an existing protocol TS 36.331.

Specifically, a measurement result of the measurement amount SINR or SNR is an IE reported by the UE to the eNB. The IE representing the measurement result in the protocol TS 36.331 is "MeasResults", and the newly added measurement amount SINR or SNR will be included in the reported measurement amount, as shown below:

```
MeasResults ::=                    SEQUENCE {
    measId                         MeasId,
    measResultPCell                SEQUENCE {
        rsrpResult                 RSRP-Range,
        rsrqResult                 RSRQ-Range,
        newmeasquantity            newmeas-Range
    },
    newMeasResultList-rx           NewMeasResultList-rx,
    measResultNeighCells           CHOICE {
        measResultListEUTRA            MeasResultListEUTRA,
        measResultListUTRA             MeasResultListUTRA,
        measResultListGERAN            MeasResultListGERAN,
        measResultsCDMA2000            MeasResultsCDMA2000,
        ...
    }                                                      OPTIONAL,
    ...,
    [[  measResultForECID-r9       MeasResultForECID-r9    OPTIONAL
    ]],
    [[  locationInfo-r10           LocationInfo-r10        OPTIONAL,
        measResultServFreqList-r10 MeasResultServFreqList-r10  OPTIONAL
    ]]
}
MeasResultListEUTRA ::= SEQUENCE  (SIZE  (1..maxCellReport))  OF
MeasResultEUTRA
    MeasResultEUTRA ::= SEQUENCE {
        physCellId                 PhysCellId,
        cgi-Info                   SEQUENCE {
            cellGlobalId               CellGlobalIdEUTRA,
            trackingAreaCode           TrackingAreaCode,
            plmn-IdentityList          PLMN-IdentityList2     OPTIONAL
        }                                                  OPTIONAL,
        measResult                 SEQUENCE {
            rsrpResult                 RSRP-Range             OPTIONAL,
            rsrqResult                 RSRQ-Range             OPTIONAL,
            ...,
            [[  additionalSI-Info-r9   AdditionalSI-Info-r9   OPTIONAL
            ]]
        }
    }
    MeasResultServFreqList-r10 ::=SEQUENCE  (SIZE  (1..maxServCell-r10))  OF
MeasResultServFreq-r10
    MeasResultServFreq-r10 ::=     SEQUENCE {
        servFreqId-r10             ServCellIndex-r10,
        measResultSCell-r10            SEQUENCE {
            rsrpResultSCell-r10            RSRP-Range,
            rsrqResultSCell-r10            RSRQ-Range
    newmeasquantity                    newmeas-Range
                                                           OPTIONAL,
        }
        measResultBestNeighCell-r10    SEQUENCE {
            physCellId-r10                 PhysCellId,
            rsrpResultNCell-r10            RSRP-Range,
            rsrqResultNCell-r10            RSRQ-Range
    newmeasquantity                        newmeas-Range
        }                                                  OPTIONAL,
        ...
    }
```

In addition, the eNB may notify, through the RRC signaling, the UE of reporting the measurement amount. The UE reports a measurement result, according to a measurement configuration IE delivered by the eNB through the RRC signaling. For example, the measurement configuration IE includes one or more pieces of the following information: reporting configuration information, a filtering coefficient, a measurement bandwidth, a measurement frequency range, or a measurement period.

It is specifically illustrated in the following that the measurement configuration IE includes a reporting configuration TB, and the RRC signaling has possible variations.

Under a certain condition (for example, event triggering or period triggering), the UE reports the measurement result to the eNB according to the IE of the reporting configuration information. For example, in the protocol TS 36.331, the IE representing the reporting configuration TB is "ReportConfig", where "ReportConfig" defines criterion of the event triggering, the period triggering, and the like.

In addition to being based on RSRP or RSRQ, based on the newly added measurement amount, the event triggering or the period triggering may be performed, where the event triggering currently includes events A1-A6 and events B1-B2 in the following:

event A1: the serving cell is better than an absolute threshold (Serving becomes better than absolute threshold);

event A2: the serving cell is worse than an absolute threshold (Serving becomes worse than absolute threshold);

event A3: the neighboring cell is an offset value better than a primary cell (Neighbour becomes amount of offset better than PCell), where the primary cell is based on carrier aggregation, for example, in non-carrier aggregation, the primary cell is the serving cell;

event A4: the neighboring cell is better than an absolute threshold (Neighbour becomes better than absolute threshold);

event A5: the primary cell is smaller than an absolute threshold, and the neighboring cell is greater than another absolute threshold (PCell becomes worse than absolute threshold1 AND Neighbour becomes better than another absolute threshold2);

event A6: the neighboring cell is an offset value better than a supplementary cell (Neighbour becomes amount of offset better than SCell), where the supplementary cell is based on the carrier aggregation, for example, in the non-carrier aggregation, the event does not exist;

event B1: the inter RAT neighboring cell is better than a threshold (Inter RAT neighbour becomes better than threshold); and event B2: the serving cell is lower than a threshold and inter RAT neighboring cell is better another threshold (Serving becomes worse than threshold1 and inter RAT neighbour becomes better than threshold2).

The newly added measurement amount SINR or SNR may be added in the reporting configuration IE "ReportConfig", that is, when the event triggering or the period triggering is satisfied, the UE reports the measurement amount SINR or SNR. The reported measurement amount may be the measurement amount of the triggered event, and may also be a subset or a whole set of multiple measurement amounts (for example, the RSRP, the RSRQ, the CRS SINR, the CSI-RS SINR, and the like). In the following embodiments, the reporting the whole set of the measurement amount is taken as an example, not excluding other reporting situations. In addition, the triggered measurement amount may also be the newly added measurement amount SINR or SNR. One item in the reporting configuration IE is "ThresholdEUTRA" configured by the eNB for the UE, that is, for the newly added measurement amount SINR or SNR, a corresponding threshold exists, and reference is made in a reportConfigEUTRA IE.

```
-- ASN1START
ReportConfigEUTRA ::=              SEQUENCE {
    triggerType                    CHOICE {
        event                      SEQUENCE {
            eventId                CHOICE {
                eventA1            SEQUENCE {
                    a1-Threshold       ThresholdEUTRA
                },
                eventA2            SEQUENCE {
                    a2-Threshold       ThresholdEUTRA
                },
                eventA3            SEQUENCE {
                    a3-Offset          INTEGER (-30..30),
                    reportOnLeave      BOOLEAN
                },
                eventA4            SEQUENCE {
                    a4-Threshold       ThresholdEUTRA
                },
                eventA5            SEQUENCE {
                    a5-Threshold1      ThresholdEUTRA,
                    a5-Threshold2      ThresholdEUTRA
                },
                ...,
                eventA6-r10        SEQUENCE {
                    a6-Offset-r10      INTEGER (-30..30),
                    a6-ReportOnLeave-r10   BOOLEAN
                }
            },
            hysteresis             Hysteresis,
            timeToTrigger          TimeToTrigger
        },
        periodical
            purpose                SEQUENCE {
                                       ENUMERATED {
                                           reportStrongestCells, reportCGI}
            }
    },
    triggerQuantity                ENUMERATED      {rsrp, rsrq,newmeasquantity},
    reportQuantity                 ENUMERATED      {sameAsTriggerQuantity, all},
    maxReportCells                 INTEGER (1..maxCellReport),
    reportInterval                 ReportInterval,
    reportAmount                   ENUMERATED {r1, r2, r4, r8, r16, r32, r64, infinity},
    ...,
    [[  si-RequestForHO-r9         ENUMERATED {setup}
            OPTIONAL,-- Cond reportCGI
        ue-RxTxTimeDiffPeriodical-r9   ENUMERATED {setup}
            OPTIONAL -- Need OR
    ]],
    [[  includeLocationInfo-r10    ENUMERATED {true}
            OPTIONAL,-- Cond reportMDT
        reportAddNeighMeas-r10     ENUMERATED {setup}
```

```
         OPTIONAL -- Need OR
             ]]
         }
         ThresholdEUTRA ::=                    CHOICE{
             threshold-RSRP                    RSRP-Range,
             threshold-RSRQ                    RSRQ-Range,
         newmeasquantity                       newmeas-Range
         }
         -- ASN1STOP
```

In addition, the measurement configuration IE may further include the filtering coefficient. For the newly added measurement amount SINR or SNR, the filtering coefficient is also needed to be increased. The possible variation of the RRC signaling is embodied in a QuantityConfig IE. Reference is made in the QuantityConfig IE.

```
         QuantityConfig ::=                      SEQUENCE {
             quantityConfigEUTRA                     QuantityConfigEUTRA
         OPTIONAL,-- Need ON
             quantityConfigUTRA                      QuantityConfigUTRA
         OPTIONAL,-- Need ON
             quantityConfigGERAN                     QuantityConfigGERAN
         OPTIONAL,-- Need ON
             quantityConfigCDMA2000                  QuantityConfigCDMA2000
         OPTIONAL,-- Need ON
             ...,
             [[  quantityConfigUTRA-v1020            QuantityConfigUTRA-v1020
         OPTIONAL -- Need ON
             ]]
         }
         QuantityConfigEUTRA ::=                 SEQUENCE {
             filterCoefficientRSRP               Filter-Coefficient    DEFAULT
fc4,
             filterCoefficientRSRQ               FilterCoefficient     DEFAULT
fc4
             filterCoefficientnewmeasquantity    FilterCoefficient     DEFAULT
fc4
         }
```

The above mentioned is the schematic illustration of the variation and the effect of the content of the RRC signal in the connected state, after the measurement amount includes the newly added measurement amount SINR or SNR.

Actually, when the measurement amount includes the newly added measurement amount SINR or SNR, the UE in the idle state may also be assisted in performing, according to measurement amount SINR or SNR, the cell selection or the cell reselection criterion.

Specifically, the protocol TS 36.304 mainly regulates behaviors of the UE in the idle state.

For the cell selection (Selection) S criterion, the UE needs to satisfy the cell selection S criterion, that is, the received signal power and the received signal quality of the measured cell is greater than a preset threshold.

When Srxlev>0 and Squal>0, the cell selection S criterion is satisfied, where $$Srxlev = Q_{rxlevmeas} - (Q_{rxlevmin} + Q_{rxlevminoffset}) - Pcompensation$$

$$Squal = Q_{qualmeas} - (Q_{qualmin} + Q_{qualminoffset})$$

| | |
|---|---|
| Srxlev | Cell selection receiving level value (dB) |
| Squal | Cell selection quality value (dB) |
| $Q_{rxlevmeas}$ | Measured cell received level value (RSRP, CSI-RS RSRP, PRP) |
| $Q_{qualmeas}$ | Measured cell quality value (RSRQ, CRS SINR/SNR, PRS SINR/SNR, CSI-RS SINR/SNR, CQI SINR/SNR) |
| $Q_{rxlevmin}$ | Minimum receiving level required in the cell (dBm) |
| $Q_{qualmin}$ | Minimum quality level required in the cell (dB) |
| $Q_{rxlevminoffset}$ | Offset amount of $Q_{rxlevmin}$ |
| $Q_{qualminoffset}$ | Offset amount of $Q_{qualmin}$ |
| Pcompensation | $\max(P_{EMAX} - P_{PowerClass}, 0)$ (dB) |
| $P_{EMAX}$ | Maximum transmission power level |
| $P_{PowerClass}$ | Maximum radio frequency output power |

It may be known from the above mentioned that in the measurement values Qrxlevmeas and Qqualmeas, the value of the newly added measurement amount is introduced, for example, CSI-RS RSRP and PRP reflecting the received signal strength, CRS SINR/SNR, PRS SINR/SNR, and CSI-RS SINR/SNR reflecting the received signal quality, and CQI SINR/SNR reflecting the channel quality.

CSI-RS RSRP is the received power on CSI-RS, PRP is the received power on the PRS, CRS SINR/SNR is the signal to interference plus noise ratio or the signal to noise ratio on the CRS, PRS SINR/SNR is the signal to interference plus noise ratio or the signal to noise ratio on the PRS, CSI-RS SINR/SNR is the signal to interference plus noise ratio or the signal to noise ratio on the CSI-RS, and the CQI SINR/SNR is the signal to interference plus noise ratio or the signal to noise ratio of a signal quality index CQI.

For the cell reselection (Reselection) R criterion, the UE needs to satisfy the cell reselection R criterion, that is, calculates the RSRP of the serving cell and the RSRP of the neighboring cell, and then sequences each cell.

A cell sequencing criterion of the serving cell: Rs=Qmeas,s+QHyst

A cell sequencing criterion of the neighboring cell: Rn=Qmeas,n−Qoffset

Where

| | |
|---|---|
| $Q_{meas, s}$ | Measurement amount of serving cell RSRP, CSI-RS RSRP, PRP, CRS SINR/SNR, PRS SINR/SNR, CSI-RS SINR/SNR, CQI SINR/SNR |
| $Q_{meas, n}$ | Measurement amount of neighboring cell |
| QHyst | Hysteresis value |
| Qoffset | For intra-frequency: if Qoffset$_{s, n}$ is valid, Qoffset is equal to Qoffset$_{s, n}$, otherwise, Qoffset is equal to 0; For inter-frequency: if Qoffset$_{s, n}$ is valid, Qoffset is equal to Qoffset$_{s, n}$ plus Qoffset$_{frequency}$, otherwise, Qoffset is equal to Qoffsetfrequency, where Qoffsets, n is an offset between the serving cell and the neighboring cell, and Qoffsetfrequency is an offset between frequency points. |

It may be known from the above mentioned that in the measurement value Qmeas,s, the value of the newly added measurement amount is introduced, for example, CSI-RS RSRP reflecting the received signal strength, CRS SINR/SNR, PRS SINR/SNR, and CSI-RS SINR/SNR reflecting the received signal quality, and CQI SINR/SNR reflecting the channel quality.

CSI-RS RSRP is the received power on the CSI-RS, PRP is the received power on the PRS, CRS SINR/SNR is the signal to interference plus noise ratio or the signal to noise ratio on the CRS, PRS SINR/SNR is the signal to interference plus noise ratio or the signal to noise ratio on the PRS, CSI-RS SINR/SNR is the signal to interference plus noise ratio or the signal to noise ratio on the CSI-RS, CQI SINR/SNR is the signal to interference plus noise ratio or the signal to noise ratio on the signal quality index CQI.

It should be understood that both a MeasResults IE through which the UE reports the measurement result to the eNB, and the reporting configuration ReportConfig IE through which the eNB indicates the UE to report the measurement amount may include or indicate one or more of the following measurement amounts: RSRP, RSRQ, CSI-RS RSRP, CSI-RS RSRQ, PRP, CRS SINR/SNR, PRS SINR/SNR, CSI-RS SINR/SNR, CQI SINR/SNR, and the like.

quency band, and is relevant to the interference, and the possible error range is [±11] dB. The measurement accuracy may include intra-frequency absolute accuracy, intra-frequency relative accuracy, inter-frequency absolute accuracy, or inter-frequency relative accuracy.

The description manner is for example:

Io represents a total received power density measured at an antenna port of the UE, including the signal and the interference.

When the measurement configuration information element includes the measurement bandwidth and/or the measurement frequency range, the base station receives the measurement amount on the measurement bandwidth and/or the measurement frequency range reported by the UE. Alternatively, when the measurement configuration information element does not include the measurement bandwidth and the measurement frequency range, the base station receives the measurement amount of the UE on the selected measurement bandwidth and/or the measurement frequency range.

Figure 4:
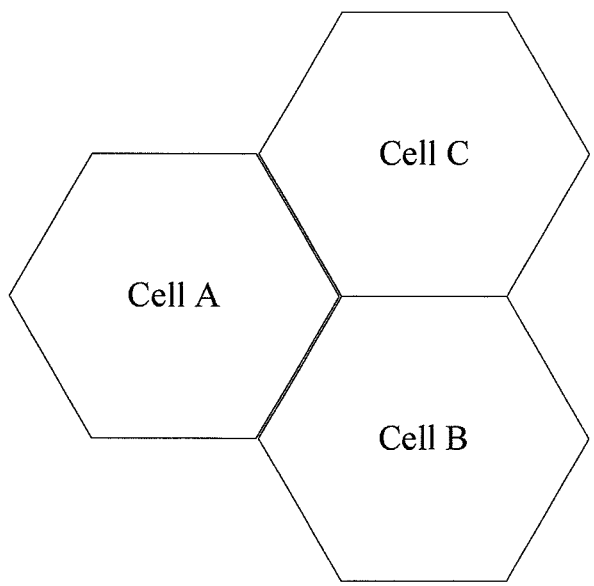
FIG. 4 is an inter-frequency networking topology view applied by a method for enhancing measurement in a wireless communication system according to an embodiment of the present invention is applied.
Figure 5:
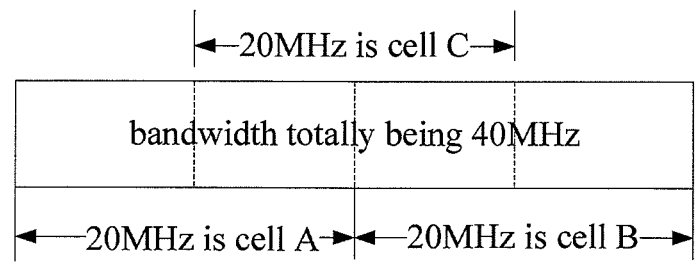
FIG. 5 is a schematic diagram of frequency range distribution of the inter-frequency networking topology view as shown in FIG. 4.
Figure 6:
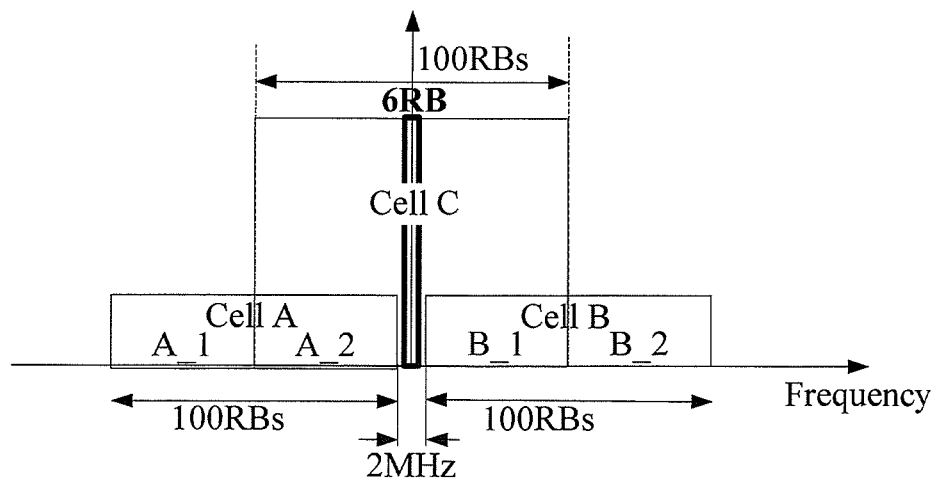
FIG. 6 is a schematic diagram of interferences in the inter-frequency networking topology as shown in FIG. 4.

Referring to FIG. 4, a network structure (for example, inter-frequency networking) newly deployed by an operator is taken as an example. A frequency band 2575-2615 MHz (totally 40M bandwidth) is totally divided into 3 frequency bands of 20 MHz (overlapping exists there-among) for being used by three neighboring cells, where center frequencies are 2585 MHz, 2595 MHz, and 2605 MHz, as shown in FIG. 5.

Under such network deployment, the measurement of the measurement amounts RSRQ and RSRP both face a problem. Currently, the regulation of the measurement bandwidth of the RSRQ of the inter-frequency neighboring cell is embodied in a system message (System Information) SIB5 and an evolved universal terrestrial radio access (Evolved Universal Terrestrial Radio Access, EUTRA) measurement target "EUTRAMeasObject" IE, and is embodied by using an "allowedmeasbandwidth" IE, where the allowedmeasbandwidth represents the maximum allowed bandwidth. In other words, the UE may measure a bandwidth smaller than allowedmeasbandwidth. In an eighth version or a ninth version of the LTE protocol, both the measurement of the RSRQ performed on the total bandwidth and the measurement of the RSRQ performed on the 6 center RBs may satisfy measurement accuracy of the RSRQ. However, in the new deployed

| | | | | Condition | | | | |
|---|---|---|---|---|---|---|---|---|
| | | Accuracy[dB] | | Frequency band 1, 4, 6, 10, 11, 18, 19, 21, 23, 24, 33, 34, 35, 36, | Frequency band 2, 5, | Frequency | Frequency band 3, 8, 12, 13, 14, | Frequency band 9, 41, |
| Parameter | Unit | Normal condition | Extreme condition | 37, 38, 39, 40 Io | 7 Io | band 25 Io | 17, 20, 22 Io | 42, 43 Io |
| Signal to noise ratio ≥ [−6]dB | dB | ±[6] | ±[9] | −121 dBm/ 15 kHz −50 dBm/ BW$_{Channel}$ | −119 dBm/ 15 kHz −50 dBm/ BW$_{Channel}$ | −117.5 dBm/ 15 kHz −50 dBm/ BW$_{Channel}$ | −118 dBm/ 15 kHz −50 dBm/ BW$_{Channel}$ | −120 dBm/ 15 kHz −50 dBm/ BW$_{Channel}$ |
| Signal to noise ratio ≥ [−6]dB | dB | ±[8] | ±[11] | −70 dBm/ 15 kHz −50 dBm/ BW$_{Channel}$ | −70 dBm/ 15 kHz −50 dBm/ BW$_{Channel}$ | −70 dBm/ 15 kHz . . . −50 dBm/ BW$_{Channel}$ | −70 dBm/ 15 kHz −50 dBm/ BW$_{Channel}$ | −70 dBm/ 15 kHz . . . −50 dBm/ BW$_{Channel}$ |

In addition, the introduced newly added measurement amount SINR or SNR may propose new demands on measurement accuracy of the UE. For example, when the signal to noise ratio is greater than −6 db or −3 dB, under the extreme environment and the normal environment (atmospheric pressure and temperature environment), an error range of the measurement amount SINR or SNR is relevant to each frescenario, the selecting the different measurement bandwidths has relatively large effect on the RSRQ.

For example, for a cell C, if only the 6 center RBs of the cell C are measured, a guard space of 0.5 MHz exists between neighboring system bandwidths of a cell A and a cell B, so that 6 center RBs of the measurement bandwidth do not fall in the interference of the cell A or the cell B, so that the RSRQ only measured in the 6 center RBs (as shown in 6) is relatively optimistic.

Further, for example, for the cell A and the cell B, the interferences on the different frequency bands in the cell are different. For example, the interference on a left (A_1) frequency band of the cell A is smaller than the interference on a right (A_2) frequency band of the cell A. Therefore, if still only 6 center RBs are measured, the situations of the interferences on the different frequency bands cannot be embodied.

For the RSRP, a problem that the RSRPs measured on the different measurement frequency bands are different exists. Similarly, for the SINR or the SNR, the problem that the SINRs or the SNRs measured on the different measurement frequency bands are different exists.

For the newly deployed network structure, the measurement bandwidth of the measurement amount and a corresponding segmented measurement value may be reported. For example, the UE reports the measurement amount of different areas on two sides of the cell A, where an identity is A_1 RSRP, A_1 RSRQ, or A_1 SINR/SNR, and reports the measurement bandwidth.

Figure 7:
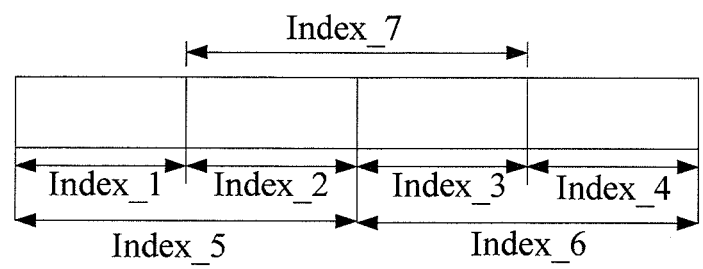
FIG. 7 shows a frequency range index diagram of the schematic diagram of frequency range distribution of FIG. 5.

Under the network topology deployment, FIG. 7 shows that the eNB divides the frequency band into different frequency range indices (index). A corresponding frequency range index table is shown in the following table, where the specific bandwidth is only exemplary. According to different network topology characteristics, other division manners may be adopted. The frequency range index table is shown in the following:

| | |
|---|---|
| Index_1 | 2575-2585 MHZ |
| Index_2 | 2585-2595 MHz |
| Index_3 | 2595-2605 MHz |
| Index_4 | 2605-2615 MHz |
| Index_5 | 2575-2595 MHz |
| Index_6 | 2595-2615 MHz |
| Index_7 | 2585-2605 MHz |
| ... | ... |

It should be understood that the base station may notify the UE of the measurement bandwidth and/or the measurement frequency range, or the UE may determine the measurement bandwidth and/or the measurement frequency range.

In a case that the base station notifies the UE of the measurement bandwidth and/or the measurement frequency range, for example, when the UE is in the idle state, the base station notifies the UE of the measurement bandwidth and/or the measurement frequency range through a broadcasting message; or when the UE is in the connected state, the base station notifies the UE of the measurement bandwidth and/or the measurement frequency range through RRC signaling. After knowing the measurement bandwidth and/or the measurement frequency range, the UE obtains the measurement amount on the measurement bandwidth and/or the measurement frequency range.

Optionally, when the base station does not notify the UE of the measurement bandwidth and/or the measurement frequency range, the UE may select the measurement bandwidth and/or the measurement frequency range, and then obtains the measurement amount on the selected measurement bandwidth and/or the measurement frequency range. No matter in which above mentioned situations, updating of the signaling is referred.

For the UE in the idle state, the base station cannot notify the measurement bandwidth of the UE by using broadcasting message instead of the RRC signaling, so that the referred broadcasting message is a master information block (MasterInformationBlock, MIB) or a system information block (SystemInformationBlock, SIB), where SIB may be divided into a system information type 1 SIB1, a system information type 2 SIB2, a system information type 3 SIB3, or a system information type 5 SIB5.

For the configuration of the measurement bandwidth or the measurement frequency of the serving cell, MIB or SIB1 or SIB2 may be modified. The base station indicates the UE to perform measurement on the regulated measurement bandwidth: the base station may indicate the UE to measure the total bandwidth of the cell, may also indicate the UE to measure one or more parts of the bandwidth of the cell, and may also indicate the UE to measure the total bandwidth and one or more parts of the bandwidth.

For the configuration of the measurement bandwidth or the measurement frequency of the neighboring cell, SIB3 or SIB5 may be modified.

SIB3

SIB3 is system information related to an intra-frequency neighboring cell. The measurement bandwidth and/or the measurement frequency range configured by the network side is added in the system message SIB3, the base station indicates the UE to perform the measurement on the regulated measurement bandwidth: the base station may indicate the UE to measure the total bandwidth of the cell, may also indicate the UE to measure one or more parts of the bandwidth of the cell, and may also indicate the UE to measure the total bandwidth and one or more parts of the bandwidth.

The following content is the possibly added content relative to the current protocol TS36.331. The newly added information element may also adopt a format of each message in the protocol TS36.331, but the final description format embodied in the protocol may be different, and here the information of the newly added information element is only exemplarily described.

| | | | |
|---|---|---|---|
| intraFreqCellReselectionInfo | | SEQUENCE { | |
| | q-RxLevMin | Q-RxLevMin, | |
| | p-Max | P-Max | OPTIONAL, |
| -- Need OP | | | |
| | s-IntraSearch | ReselectionThreshold | OPTIONAL, |
| -- Need OP | | | |
| | allowedMeasBandwidth | AllowedMeasBandwidth | OPTIONAL, |
| -- Need OP | | | |
| | measbandwidthIndex | SEQUENCE { | |
| | measbandwidth1, | integer | optional, |
| | measbandwidth2, | integer | optional, |
| | ... | | |
| | } | | optional, |
| | presenceAntennaPort1 | PresenceAntennaPort1, | |
| | neighCellConfig | NeighCellConflg, | |

```
            t-ReselectionEUTRA           T-Reselection,
            t-ReselectionEUTRA-SF        SpeedStateScaleFactors   OPTIONAL
-- Need OP
        },
```

SIB5

SIB5 is system information related to an inter-frequency neighboring cell. The measurement bandwidth and/or the measurement frequency range configured by the network side is added in the system message SIB5, the base station may indicate the UE to measure the total bandwidth of the cell, may also indicate the UE to measure one or more parts of the bandwidth of the cell, and may also indicate the UE to measure the total bandwidth and one or more parts of the bandwidth.

The following content is the possibly added content relative to the current protocol TS36.331. It is only illustrative that the newly added information element may also adopt a format of each message in the protocol TS36.331.

```
                InterFreqCarrierFreqInfo ::=   SEQUENCE {
                    dl-CarrierFreq               ARFCN-ValueEUTRA,
                    q-RxLevMin                   Q-RxLevMin,
                    p-Max                        P-Max
            OPTIONAL,  -- Need OP
                    t-ReselectionEUTRA           T-Reselection,
                    t-ReselectionEUTRA-SF        SpeedStateScaleFactors
            OPTIONAL,  -- Need OP
                    threshX-High                 ReselectionThreshold,
                    threshX-Low                  ReselectionThreshold,
                    allowedMeasBandwidth         AllowedMeasBandwidth,
                measbandwidthIndex                   SEQUENCE {
                measbandwidth1,              integer      optional,
                measbandwidth2,              integer      optional,
                ...
                }                                            optional,
                    presenceAntennaPort1         PresenceAntennaPort1,
                    cellReselectionPriority      CellReselectionPriority
            OPTIONAL,  -- Need OP
                    neighCellConfig              NeighCellConfig,
                    q-OffsetFreq                 Q-OffsetRange      DEFAULT
        dB0,
                    interFreqNeighCellList       InterFreqNeighCellList
            OPTIONAL,          -- Need OR
                    interFreqBlackCellList       InterFreqBlackCellList
            OPTIONAL,          -- Need OR
                    ...,
```

For the UE in the connected state, the network may notify the measurement bandwidth and/or the measurement frequency range of the UE by using the RRC signaling, so that the referred RRC signaling includes the RRC signaling relevant to measurement target configuration.

RRC Signaling Relevant to the Measurement Target Configuration

The configured measurement bandwidth and/or the measurement frequency range is added in a measurement target, the network side may indicate the UE to measure the total bandwidth of the cell, may also indicate the UE to measure one or more parts of the bandwidth of the cell, and may also indicate the UE to measure the total bandwidth and one or more parts of the bandwidth.

An IE of the measurement target in the current protocol TS 36.331 is "MeasObjectEUTRA".

```
            -- ASN1START
            MeasObjectEUTRA ::=              SEQUENCE {
                carrierFreq                  ARFCN-ValueEUTRA,
                allowedMeasBandwidth         AllowedMeasBandwidth,
            measbandwidthIndex                   SEQUENCE {
            measbandwidth1,              integer      optional,
            measbandwidth2,              integer      optional,
            ...
            }                                            optional,
                presenceAntennaPort1         PresenceAntennaPort1,
```

```
            neighCellConfig                    NeighCellConfig,
            offsetFreq                         Q-OffsetRange            DEFAULT dB0,
            -- Cell list
            cellsToRemoveList                  CellIndexList
    OPTIONAL,  --Need ON
            cellsToAddModList                  CellsToAddModList
    OPTIONAL,  -- Need ON
            -- Black list
            blackCellsToRemoveList             CellIndexList
    OPTIONAL,  -- Need ON
            blackCellsToAddModList             BlackCellsToAddModList
    OPTIONAL,  -- Need ON
            cellForWhichToReportCGI            PhysCellId
    OPTIONAL,  -- Need ON
            ...,
            [[measCycleSCell-r10               MeasCycleSCell-r10       OPTIONAL,
    -- Need ON
                    measSubframePatternConfigNeigh-r10MeasSubframePatternConfigNeigh-r10
    OPTIONAL                        -- Need ON
            ]]
        }
        CellsToAddModList ::=                  SEQUENCE (SIZE (1..maxCellMeas)) OF
    CellsToAddMod
        CellsToAddMod ::=  SEQUENCE {
            cellIndex                          INTEGER (1..maxCellMeas),
            physCellId                         PhysCellId,
            cellIndividualOffset               Q-OffsetRange
        }
        BlackCellsToAddModList ::=             SEQUENCE (SIZE (1..maxCellMeas)) OF
    BlackCellsToAddMod
        BlackCellsToAddMod ::=  SEQUENCE {
            cellIndex                          INTEGER (1..maxCellMeas),
            physCellIdRange                    PhysCellIdRange
        }
        MeasCycleSCell-r10 ::=                 ENUMERATED {sf160, sf256, sf320,
    sf512,
                                                        sf640, sf1024, sf1280, spare1}
        MeasSubframePatternConfigNeigh-r10 ::= CHOICE {
            release                            NULL,
            setup                              SEQUENCE {
                measSubframePatternNeigh-r10         MeasSubframePattern-r10,
                measSubframeCellList-r10             MeasSubframeCellList-r10
    OPTIONAL -- Need OP
            }
        }
        MeasSubframeCellList-r10 ::=  SEQUENCE  (SIZE  (1..maxCellMeas))  OF
    PhysCellIdRange
    -- ASN1STOP
```

A bandwidth or a frequency range to be measured by the UE is configured in the measurement target, the UE has one group of measurement results corresponding to each configured measurement bandwidth and/or the measurement frequency range, and the UE reports the combination of the measurement bandwidth and/or the measurement frequency range and the measurement result.

The measurement result IE is identified as "MeasResult in the protocol TS 36.331. As described above, for example, the configured measurement bandwidth is added in the measurement target, the base station indicates the UE to perform the measurement on the regulated measurement bandwidth, and the UE may measure the total bandwidth of the cell, and may also measure a part of the bandwidth of the cell. When reporting the measurement result, the UE has one group of measurement results corresponding to each configured measurement bandwidth. That is to say, the following is reported in the measurement result: the measurement frequency band/the measurement frequency range of the serving cell, the measurement result of the RSRP, the measurement result of the RSRQ, the measurement result of the SINR/SNR, the measurement frequency band/measurement frequency range of the neighboring cell, the measurement result of the RSRP, the measurement result of the RSRQ, and the measurement result of the SINR/SNR. The added content is noted below:

```
            NewMeasResultList-rx ::= SEQUENCE (SIZE (1..BandIndex)) OF newMeasResult
                newMeasResult                  SEQUENCE {
                    measbandwidthIndex                   measbandwidthIndex,
                    rsrpResult                           RSRP-Range,
                    rsrqResult                           RSRQ-Range,
                    newmeasquatityResults                newmeasquatity- Range
                },
                MeasResults ::=                SEQUENCE {
                    measId                     MeasId,
                    measResultPCell            SEQUENCE {
```

```
            rsrpResult                      RSRP-Range,
            rsrqResult                      RSRQ-Range
        },
        newMeasResultList-rx                NewMeasResultList-rx,
        measResultNeighCells                CHOICE {
            measResultListEUTRA                 MeasResultListEUTRA,
            measResultListUTRA                  MeasResultListUTRA,
            measResultListGERAN                 MeasResultListGERAN,
            measResultsCDMA2000                 MeasResultsCDMA2000,
            ...
        }
    OPTIONAL,
        ...,
        [[  measResultForECID-r9            MeasResultForECID-r9
    OPTIONAL
        ]],
        [[  locationInfo-r10                LocationInfo-r10
    OPTIONAL,
            measResultServFreqList-r10      MeasResultServFreqList-r10
    OPTIONAL
        ]]
    }
    MeasResultListEUTRA ::=                 SEQUENCE (SIZE (1..maxCellReport)) OF
MeasResultEUTRA
    MeasResultEUTRA ::=SEQUENCE {
        physCellId                          PhysCellId,
        cgi-Info                            SEQUENCE {
            cellGlobalId                        CellGlobalIdEUTRA,
            trackingAreaCode                    TrackingAreaCode,
            plmn-IdentityList                   PLMN-IdentityList2
    OPTIONAL
        }                                                       OPTIONAL,
        measResult                          SEQUENCE {
            rsrpResult                          RSRP-Range
    OPTIONAL,
            rsrqResult                          RSRQ-Range
    OPTIONAL,
            ...,
        newMeasResult                       SEQUENCE {
            measbandwidthIndex                  measbandwidthIndex,
            rsrpResult                          RSRP-Range,
            rsrqResult                          RSRQ-Range,
            newmeasquatityResults               newmeasquatity- Range
        },
        [[  additionalSI-Info-r9            AdditionalSI-Info-r9
    OPTIONAL
        ]]
        }
    }
    MeasResultServFreqList-r10 ::=SEQUENCE  (SIZE  (1..maxServCell-r10))  OF
MeasResultServFreq-r10
    MeasResultServFreq-r10 ::=              SEQUENCE {
        servFreqId-r10                      ServCellIndex-r10,
        measResultSCell-r10                     SEQUENCE {
            rsrpResultSCell-r10                 RSRP-Range,
            rsrqResultSCell-r10                 RSRQ-Range
        }                                                       OPTIONAL,
        measResultBestNeighCell-r10             SEQUENCE {
            physCellId-r10                      PhysCellId,
            rsrpResultNCell-r10                 RSRP-Range,
            rsrqResultNCell-r10                 RSRQ-Range
        }                                                       OPTIONAL,
        ...
    }
```

If the base station delivers a measurement configuration IE of the eighth version or the ninth version of the LTE, the UE independently selects the measurement frequency band and/or the measurement frequency range. Each configured measurement bandwidth/frequency range corresponds to one group of measurement results, and the UE reports such a combination of the measurement bandwidth/frequency range and the measurement result.

The measurement result IE is identified as "MeasResult in the protocol TS 36.331. As described above, for example, the configured measurement bandwidth is added in the measurement target, the base station indicates the UE to perform the measurement on the regulated measurement bandwidth, and the UE may measure the total bandwidth of the cell, and may also measure a part of the bandwidth of the cell. When reporting the measurement result, the UE has one group of measurement results corresponding to each configured measurement bandwidth. That is to say, the following is reported in the measurement result: the measurement frequency band/the measurement frequency range of the serving cell and the measurement result of the RSRP, the measurement result of the RSRQ or the measurement result of the SINR/SNR, the measurement frequency band/measurement frequency range of the neighboring cell and the measurement result of the RSRP, the measurement result of the RSRQ or the measurement result of the SINR/SNR. The added content is noted below:

```
NewMeasResultList-rx ::= SEQUENCE (SIZE (1..BandIndex)) OF newMeasResult
    newMeasResult              SEQUENCE {
        measbandwidthIndex         measbandwidthIndex,
        rsrpResult                 RSRP-Range,
        rsrqResult                 RSRQ-Range,
        newmeasquatityResults      newmeasquatity- Range
},
MeasResults ::=                SEQUENCE {
    measId                     MeasId,
    measResultPCell            SEQUENCE {
        rsrpResult                 RSRP-Range,
        rsrqResult                 RSRQ-Range
    },
    newMeasResultList-rx            NewMeasResultList-rx,
    measResultNeighCells       CHOICE {
        measResultListEUTRA        MeasResultListEUTRA,
        measResultListUTRA         MeasResultListUTRA,
        measResultListGERAN        MeasResultListGERAN,
        measResultsCDMA2000        MeasResultsCDMA2000,
        ...
    }    OPTIONAL,
    ...,
    [[  measResultForECID-r9       MeasResultForECID-r9   OPTIONAL
    ]],
    [[  locationInfo-r10           LocationInfo-r10       OPTIONAL,
        measResultServFreqList-r10    MeasResultServFreqList-r10   OPTIONAL
    ]]
}
MeasResultListEUTRA ::=        SEQUENCE (SIZE (1..maxCellReport)) OF MeasResultEUTRA
    MeasResultEUTRA ::= SEQUENCE {
        physCellId                 PhysCellId,
        cgi-Info                   SEQUENCE {
            cellGlobalId               CellGlobalIdEUTRA,
            trackingAreaCode           TrackingAreaCode,
            plmn-IdentityList          PLMN-IdentityList2   OPTIONAL
        }                                                  OPTIONAL,
        measResult                 SEQUENCE {
            rsrpResult                 RSRP-Range   OPTIONAL,
            rsrqResult                 RSRQ-Range   OPTIONAL,
            ...,
            newMeasResult              SEQUENCE {
                measbandwidthIndex         measbandwidthIndex,
                rsrpResult                 RSRP-Range,
                rsrqResult                 RSRQ-Range,
                newmeasquatityResults      newmeasquatity- Range
            },
            [[  additionalSI-Info-r9       AdditionalSI-Info-r9   OPTIONAL
            ]]
        }
    }
    MeasResultServFreqList-r10 ::=SEQUENCE  (SIZE  (1..maxServCell-r10))  OF MeasResultServFreq-r10
    MeasResultServFreq-r10 ::=         SEQUENCE {
        servFreqId-r10             ServCellIndex-r10,
        measResultSCell-r10            SEQUENCE {
            rsrpResultSCell-r10        RSRP-Range,
            rsrqResultSCell-r10        RSRQ-Range
        }                                              OPTIONAL,
        measResultBestNeighCell-r10    SEQUENCE {
            physCellId-r10             PhysCellId,
            rsrpResultNCell-r10        RSRP-Range,
            rsrqResultNCell-r10        RSRQ-Range
        }                                              OPTIONAL,
        ...
    }
```

In addition, the measurement configuration IE may further include a measurement period. The measurement period may also be delivered to the UE through the RRC signaling, for example, embodied in the measurement configuration IE.

The UE may obtain, according to the measurement period indicated by the base station, the measurement amount, or the UE may also obtain the measurement amount according to the measurement period configured by itself. The selection of the measurement period also affects the network communication performance.

Currently, when the measurement amount RSRP or RSRQ is obtained, the measurement is performed by adopting A fixed measurement period. The measurement period adopted in consideration of one or more of the measurement accuracy, the power consumption of the user equipment, and the reference signal periodicity is, for example, a variable measurement period. In the following, although the newly added measurement amount CSI-RS SINR/SNR is taken as an example for illustrating how to adopt the variable measurement period, it should be understood that the variable measurement period may also be applied to obtain the newly added measurement amount CSI-RS RSRP or CSI-RS RSRQ.

The long term evaluation advanced (Long Teen Evaluation Advanced, LTE-A) system CoMP scenario is taken as an example. The eNB and the remote radio head (Remote Radio Head, RRH) have the same cell identity (Identity, ID), that is, send the same CRS, in addition, the CSI-RS may be used to differentiate different nodes, that is, eNB or RRH. For example, 6.10.5 of the protocol TS 36.211-a30 defines CSI-RS.

The standard defines a series of CSI-RS configurations (CSI reference signal configuration), according to different CSI-RS configuration indices (index), the CSI-RS may be sent on a specific RE of a subframe. The standard also defines a series of CSI-RS subframe configuration (CSI-RS-SubframeConfig, $I_{CSI-RS}$) according to different CSI-RS subframe configurations, the CSI-RS may be sent on a specific subframe by using a configured CSI-RS periodicity (CSI-RS periodicity, $T_{CSI-RS}$). The configured CSI-RS periodicity may be 5 ms, 10 ms, 20 ms, 40 ms, or 80 ms.

Currently, the RRM measurement amount based on the CRS is RSRP or RSRQ, may be used for mobility, for example, cell handover, cell selection, and cell reselection, and may also be used for inter-cell interference coordination (ICIC) and the like. However, the measurement amount of the CSI-RS is mainly used for a channel quality indicator (Channel Quality Indicator, CQI) of channel estimation, a precoding matrix indicator (Precoding Matrix Indicator, PMI), a rank indicator (Rank Indicator, RI), and the like. Therefore, the CSI-RS does not define the relevant RRM measurement amount.

If the CSI-RS also has the RRM relevant measurement, it is a problem to be solved whether the measurement period of the measurement amount satisfies the power consumption of the UE, the measurement accuracy, the system performance, and the like, but the current standard does not have the relevant regulation. In addition, the current measurement period and the handover process are not certainly suitable for using the RRM measurement of the CRS under the CoMP scenario.

If the sampling is performed each 5 ms or 10 ms, the power consumption of the UE is relatively large. For configuration of a relatively small CSI-RS periodicity, if the power consumption of the UE is considered, a sampling interval may be expanded, for example, the sampling is performed each 20 ms or 40 ms. The sampling interval (sampling interval) should be an integral multiple of the CSI-RS periodicity. Generally, the measurement period (measurement period) is also an integral multiple of the CSI-RS periodicity.

Optionally, the measurement accuracy of the CSI-RS is considered, for the minimal demand of the single antenna port, the sampling is performed each 5 ms or 10 ms, the measurement period of 200 ms may satisfy the demand of the accuracy (the accuracy is the demand of the measurement accuracy of the CRS defined in the standard). However, for configuration of a relatively large CSI-RS periodicity, a corresponding sampling interval is also relatively large, in order to satisfy the same accuracy demand, the measurement period needs to be expanded, that is, for the CSI-RS periodicity of 40 ms, the corresponding measurement period needs to be 600 ms or 800 ms instead of 200 ms. A reason for expanding a CSI-RS measurement period is that the CRS is sent on each subframe, and the single antenna port on a subframe is mapped to 8 REs. Compared with the CRS, the sending of the CSI-RS is more loose, the CSI-RS may only be sent with the CSI-RS periodicity, the single antenna port on a subframe is mapped to 2 REs. Therefore, for the CSI-RS measurement period, in order to ensure the measurement period, different CSI-RS periodicities cannot be lower than a certain value, that is, correspond to different lower limits.

In consideration of the effect of the measurement of the CSI-RS on the system performance, as the measurement period is increased, the handover failure rate is increased, and the system throughput is reduced. That is to say, the measurement period is too large, and the system performance is lowered, further, the affecting degree is relevant to the number of nodes of a coordination set. Therefore, in the case of not affecting the system performance, the CSI-RS measurement period cannot exceed a value, that is, when the measurement period range is defined, an upper limit is required.

For example, for the design of the CSI-RS measurement period, the following methods may be considered:

1. The sampling interval should be an integral multiple of the CSI-RS periodicity.
2. The measurement period should also be an integral multiple of the CSI-RS periodicity.
3. For the CSI-RS measurement period, in order to ensure the measurement accuracy, the different CSI-RS periodicities cannot be lower than a certain value, that is, correspond to different lower limits.
4. In a case of not affecting system performance, the CSI-RS measurement period cannot exceed a value, that is, when the measurement period range is defined, an upper limit is required.
5. The measurement period may be embodied by defining core demands (the minimal demand of the single antenna port) of the UE, as shown in Table 1.
6. The measurement period may be delivered to the UE through the RRC signaling.

TABLE 1

| | CSI-RS measurement period | | | | |
|---|---|---|---|---|---|
| | CSI-RS measurement period | | | | |
| | 5 ms | 10 ms | 20 ms | 40 ms | 80 ms |
| Measurement period under non-DRX | Form 1, form 2, form 3 | | | | |
| Measurement period under DRX | Form 4 | | | | |

Non-DRX is continuous reception, and DRX is discontinuous reception.

Form 1: a set of measurement periods

Non-DRX, 5 ms: a subset of an enumeration set {200 ms, 400 ms, 600 ms, 800 ms, 1000 ms, 1200 ms, 1400 ms, 1600 ms}

Non-DRX, 10 ms: a subset of an enumeration set {200 ms, 400 ms, 600 ms, 800 ms, 1000 ms, 1200 ms, 1400 ms, 1600 ms}

Non-DRX, 20 ms: a subset of an enumeration set {400 ms, 600 ms, 800 ms, 1000 ms, 1200 ms, 1400 ms, 1600 ms}

Non-DRX, 40 ms: a subset of an enumeration set {600 ms, 800 ms, 1000 ms, 1200 ms, 1400 ms, 1600 ms}

Non-DRX, 80 ms: a subset of an enumeration set {1000 ms, 1200 ms, 1400 ms, 1600 ms}

Form 2: a span of measurement periods

Non-DRX, 5 ms: (200 ms, 1600 ms)
Non-DRX, 10 ms: (200 ms, 1600 ms)
Non-DRX, 20 ms: (400 ms, 1600 ms)
Non-DRX, 40 ms: (600 ms, 1600 ms)
Non-DRX, 80 ms: (1000 ms, 1600 ms)

Form 3: a measCycleCSI-RS is newly defined, Tmeasure_CSI-RS is an integral multiple (N times) of measCycleCSI-RS Tmeasure_CSI-RS=N measCycleCSI-RS, N=5.

Non-DRX, 5 ms: measCycleCSI-RS is a subset of an enumeration set {40 ms, 80 ms, 120 ms, 160 ms, 200 ms, 240 ms, 280 ms, 320 ms}

Non-DRX, 10 ms: measCycleCSI-RS is a subset of an enumeration set {40 ms, 80 ms, 120 ms, 160 ms, 200 ms, 240 ms, 280 ms, 320 ms}

Non-DRX, 20 ms: measCycleCSI-RS is a subset of an enumeration set {80 ms, 120 ms, 160 ms, 200 ms, 240 ms, 280 ms, 320 ms}

Non-DRX, 40 ms: measCycleCSI-RS is a subset of an enumeration set {120 ms, 160 ms, 200 ms, 240 ms, 280 ms, 320 ms}

Non-DRX, 80 ms: measCycleCSI-RS is a subset of an enumeration set {200 ms, 240 ms, 280 ms, 320 ms}

Form 4: a measurement period relevant to the DRX cycle

Tmeasure_CSI-RS=max(5 measCycleCSI-RS, Tmeasure_CSI-RSI).

DRX, 5 ms:

| DRX cycle (DRX-Cycle) length (s) | Tmeasure_ CSI-RS1 (s) (DRX cycle) |
| --- | --- |
| ≤0.04 | 0.2 (Note1) |
| 0.04 < DRX-cycle ≤ 2.56 | Note2 (5) |

(Note1):
the number of DRX cycles is according to a DRX cycle being used
Note2:
the time is according to a DRX cycle being used DRX, 10 ms:

| DRX cycle (DRX-Cycle) length (s) | Tmeasure_ CSI-RS1 (s) (DRX cycle) |
| --- | --- |
| ≤0.04 | 0.2 (Note1) |
| 0.04 < DRX-cycle ≤ 2.56 | Note2 (5) |

(Note1):
the number of DRX cycles is according to a DRX cycle being used
Note2:
the time is according to a DRX cycle being used DRX, 20 ms:

| DRX cycle (DRX-Cycle) length (s) | Tmeasure_ CSI-RS1 (s) (DRX cycle) |
| --- | --- |
| ≤0.04 | 0.4 (Note1) |
| 0.04 < DRX-cycle ≤ 2.56 | Note2 (10) |

(Note1):
the number of DRX cycles is according to a DRX cycle being used
Note2:
the time is according to a DRX cycle being used DRX, 40 ms:

| DRX cycle (DRX-Cycle) length (s) | Tmeasure_ CSI-RS1 (s) (DRX cycle) |
| --- | --- |
| ≤0.04 | 0.6 (Note1) |
| 0.04 < DRX-cycle ≤ 2.56 | Note2 (15) |

(Note1):
the number of DRX cycles is according to a DRX cycle being used
Note2:
the time is according to a DRX cycle being used DRX, 80 ms:

| DRX cycle (DRX-Cycle) length (s) | Tmeasure_ CSI-RS1 (s) (DRX cycle) |
| --- | --- |
| ≤0.04 | 1.0 (Note1) |
| 0.04 < DRX-cycle ≤ 2.56 | Note2 (25) |

(Note1):
the number of DRX cycles is according to a DRX cycle being used
Note2:
the time is according to a DRX cycle being used In addition, the measurement period may be delivered to the UE through the RRC signaling, for example, may be delivered to the UE through the measurement configuration IE carried in the RRC signaling. The specific RRC signaling includes the following content:

Form 1:

For example, the IE "MeasObjectEUTRA" includes a subset of an enumeration set of the CSI-RS measurement period.

MeasPeriodCSI-RS-r11::=ENUMERATED { sf200, sf400, sf600, sf800, sf1000, sf1200, sf1400, sf1600}

Form 2:

For example, the IE "MeasObjectEUTRA" includes the span of the CSI-RS measurement period.

MeasPeriodCSI-RS-r11::=Lower threshold sf200
Higher threshold sf1600

Form 3:

For example, the IE "MeasObjectEUTRA" includes the newly defined measCycleCSI-RS.

MeasCycleCSI-RS-r11::=ENUMERATED {sf40, sf80, sf120, sf160, sf200, sf240, sf280, sf320} sf represents the subframe, in which a time length of a subframe is 1 ms (millisecond).

The RRM measurement of the CRS is used under the CoMP scenario, the measurement period may be expanded, thereby saving the power consumption of the UE. For the expanding manner, please refer to the design manner of the CSI-RS measurement period.

When the CoMP coordination set is inconsistent with the CRS sending set, the newly added measurement amount SINR/SNR is required to assist with the handover process. In addition, when the RRM measurement amount of the CSI-RS is used for mobility, the newly added measurement amount SINR/SNR may also be used to assist with the handover process.

The heterogeneous networks (Heterogeneous Networks, hetnet) scenario is taken as an example, a handover failure rate in the network is relatively high, particularly, the UE performs handover from a pico cell (pico cell) to a macro cell (macro cell). The main reason of the relatively high handover failure rate is that the interference on the two pieces of signaling "handover command (handover command)" and "handover complete (handover complete)" in the handover process is relatively heavy, thereby resulting that the transmission success rate is relatively low. The current handover decision depends on RSRP or RSRQ. The newly added measurement amount SINR/SNR may be used as a handover assisting decision condition, thereby improving the handover success rate, and meanwhile lowering a ping-pong handover.

Figure 8:
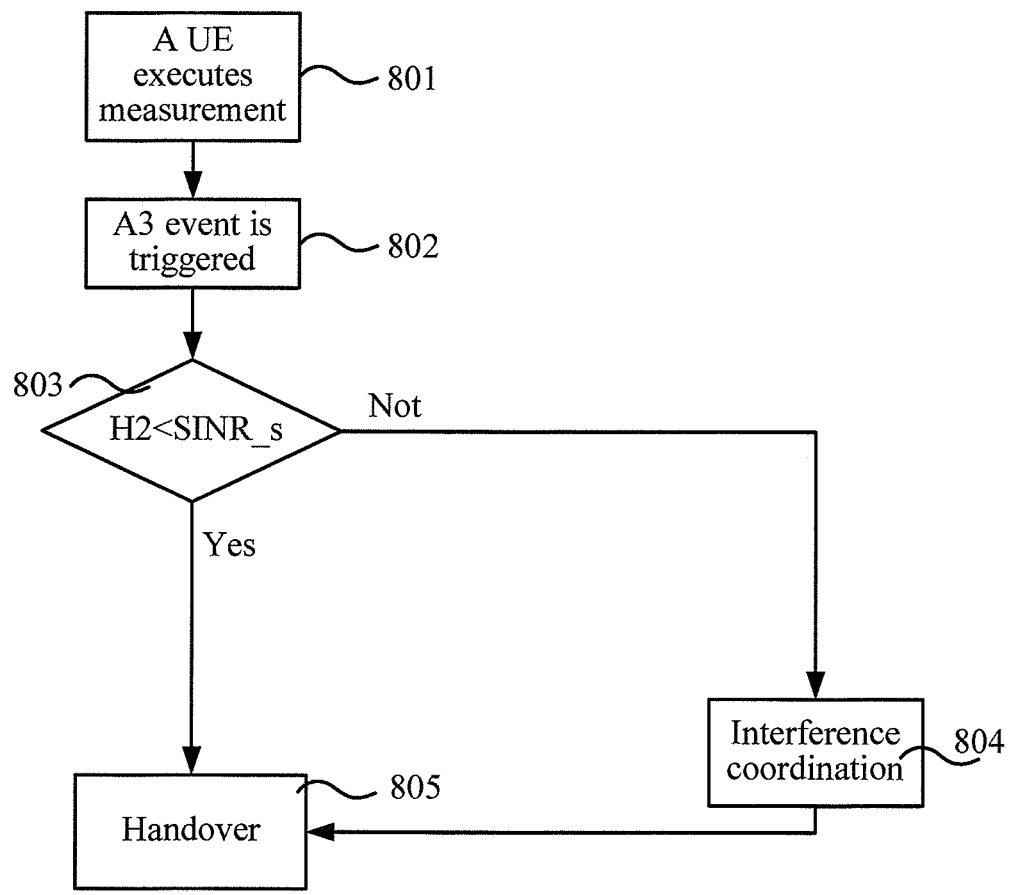
FIG. 8 is a flowchart where a base station performs cell handover decision according to a newly added measurement amount according to an embodiment of the present invention.

FIG. 8 shows an embodiment where a base station performs cell handover decision according to a measurement amount obtained by an UE.

Step 801: The UE executes measurement, so as to obtain an SINR/SNR, and an RSRP or RSRQ.

Step 802: The UE determines, through the RSRP or the RSRQ, whether an event is triggered, and may also determine, through the SINR/SNR, whether the event is triggered. For example, if it is determined that A3 is triggered, a measurement amount is reported to the base station. When the UE reports the A3 event, in addition to reporting an RSRP or RSRQ of a serving cell and an RSRP or RSRQ of a neighboring cell, the UE further needs to report a measured SINR/SNR of the serving cell and an SINR/SNR of the target cell.

Step 803: An eNB determines, according to the A3 event reported by the UE, channel quality of the serving cell: the base station compares the signal to interference plus noise ratio SINR or the signal to noise ratio SNR of the serving cell with a second threshold (TH2); if the SINR or the SNR of the serving cell is smaller than or equal to TH2, turn to step 804; and if the SINR or the SNR of the serving cell is greater than TH2, turn to step 805.

Step 804: The eNB performs interference coordination, and then sends a handover command to the UE, for example, TH2 may be used to indicate the channel quality (for example, the signal to interference plus noise ratio or the signal to noise ratio) when the handover command is ensured to be correctly delivered set by the serving cell.

Step 805: The eNB sends the handover command to the UE.

In an embodiment, if the SINR or the SNR of the serving cell is smaller than or equal to TH2, the interference coordination may be not performed, and the measurement is continued.

The newly added measurement amount, for example, the SINR or the SNR, is introduced, so that as long as the channel quality when the handover command is ensured to be correctly delivered is reached, the handover command is delivered, so as to improve a handover success rate.

Figure 9:
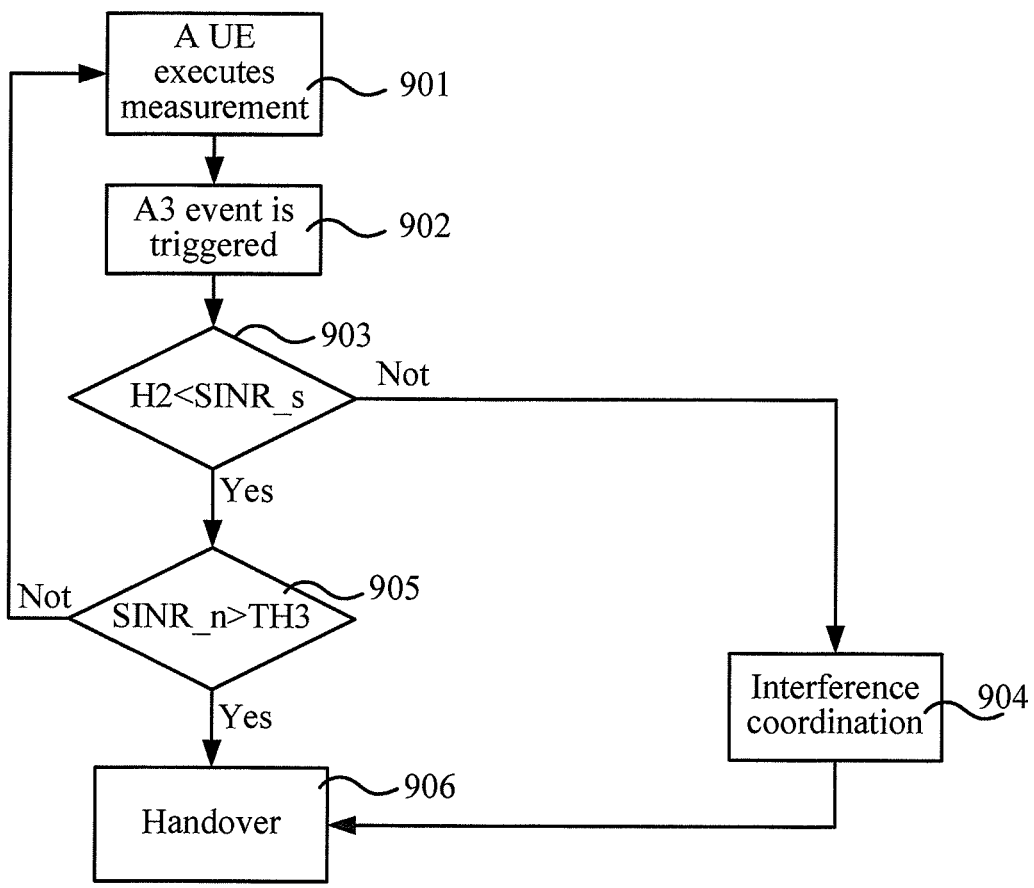
FIG. 9 is a flowchart where a base station performs cell handover decision according to a newly added measurement amount according to an embodiment of the present invention.
Figure 10:
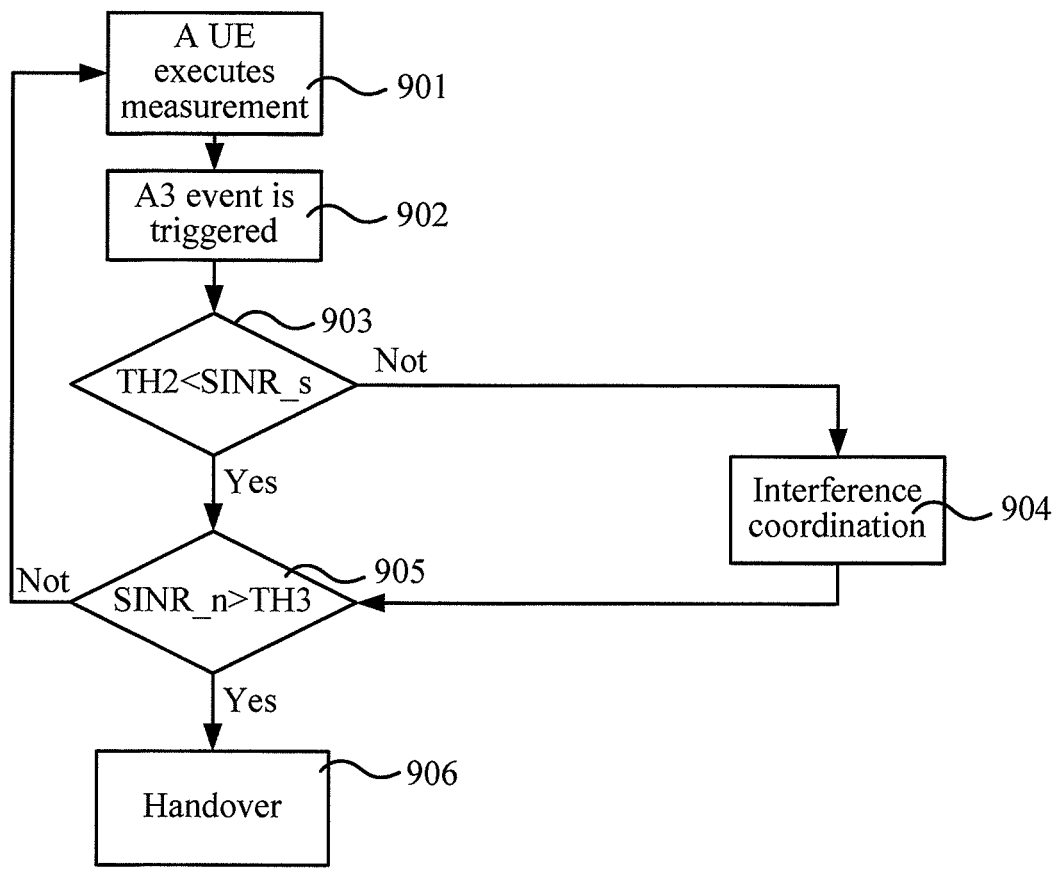
FIG. 10 is a flowchart where a base station performs cell handover decision according to a newly added measurement amount according to an embodiment of the present invention.

FIG. 9 and FIG. 10 show some other embodiments where a base station performs cell handover decision according to a measurement amount obtained by an UE according to embodiments of the present invention.

Further, if an SINR or an SNR of a serving cell is greater than TH2, it is further necessary to compare an SINR or an SNR of a target cell with a third threshold (TH3), if the SINR or the SNR of the target cell is greater than TH3, a handover command is sent to the UE. In the following, illustration is performed with reference to FIG. 9.

Step 901: the UE executes measurement, so as to obtain an SINR/SNR, and an RSRP or RSRQ.

Step 902: The UE determines, through the RSRP or the RSRQ, whether an event is triggered, and may also determine, through the SINR/SNR, whether the event is triggered. If it is determined that A3 is triggered, a measurement amount, for example, the SINR, is reported to the base station. When the UE reports the A3 event, in addition to reporting an RSRP or RSRQ of a serving cell and an RSRP or RSRQ of a neighboring cell, the UE further needs to report a measured SINR/SNR of the serving cell and an SINR/SNR of the target cell.

Step 903: An eNB determines, according to the A3 event reported by the UE, channel quality of the serving cell: the base station compares the SINR or the SNR of the serving cell with TH2; if the SINR or the SNR of the serving cell is smaller than or equal to TH2, turn to step 904; and if the SINR or the SNR of the serving cell is greater than TH2, turn to step 905.

Step 904: The eNB performs interference coordination, and then turn to 906, where TH2 may be used to indicate the channel quality when the handover command is ensured to be correctly delivered set by the serving cell.

Step 905: Compare the SINR or the SNR of the target cell with TH3, if the SINR or the SNR of the target cell is greater than TH3, turn to step 906, otherwise, turn to step 901.

Step 906: Send the handover command to the UE.

It may be known from FIG. 10 that it is different from FIG. 9 that in step 904, after the eNB performs the interference coordination, turn to 905.

In the method, the cell interference coordination refers to that: PRB information used by the serving cell for the handover command is sent to a base station of the target cell, so that the base station of the target cell does not use the PRB, or a sending power of the base station of the target cell on the PRB is lowered.

It may be known that the newly added measurement amount, for example, the SINR or the SNR, is introduced, so that as long as the channel quality when the handover command is ensured to be correctly delivered is reached, the handover command is delivered, so as to improve a handover success rate.

Figure 11:
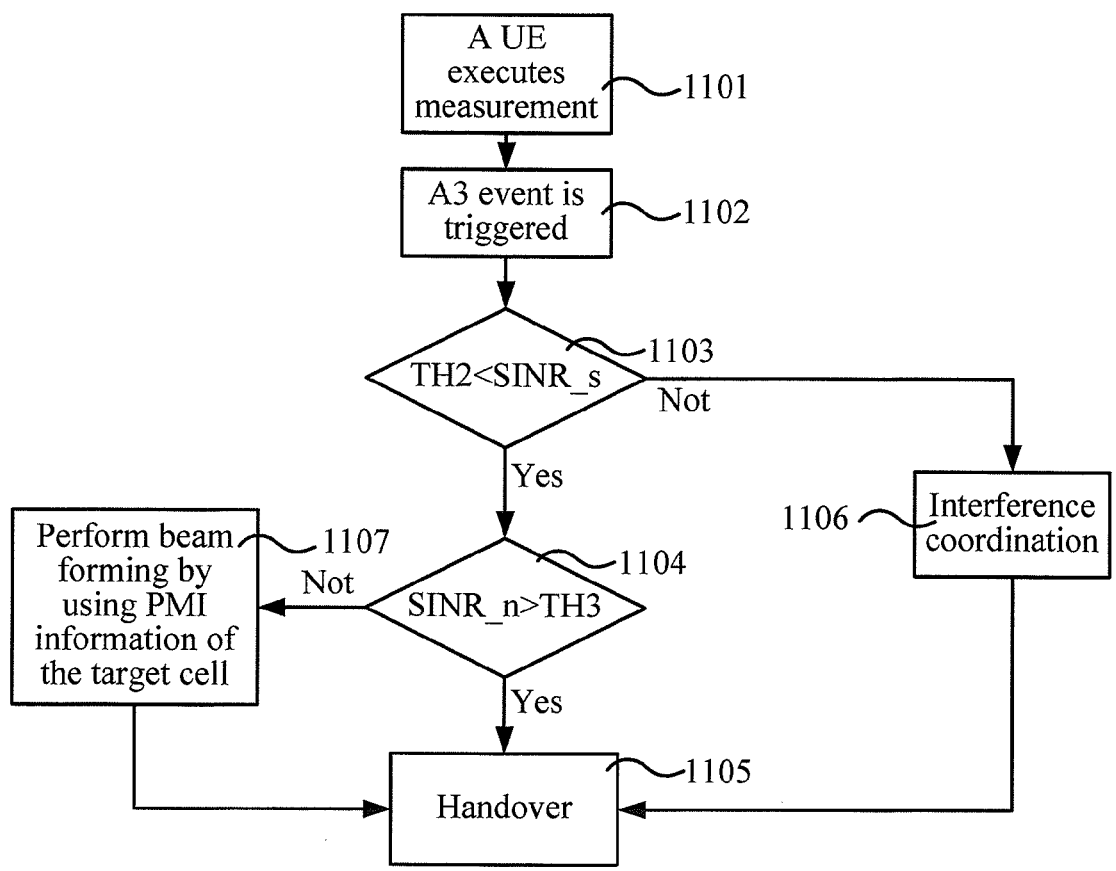
FIG. 11 is a flowchart where a base station performs cell handover decision according to a newly added measurement amount according to an embodiment of the present invention.
Figure 12:
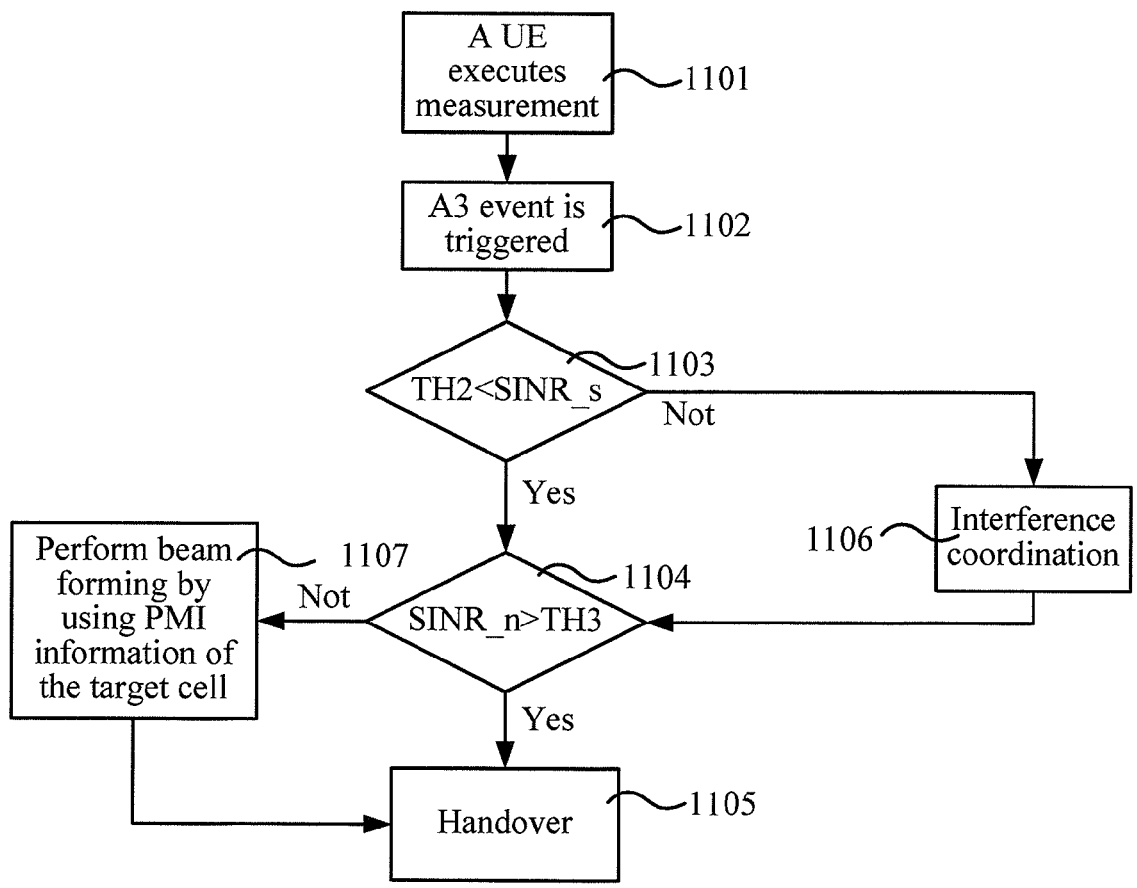
FIG. 12 is a flowchart where a base station performs cell handover decision according to a newly added measurement amount according to an embodiment of the present invention.

FIG. 11 and FIG. 12 show some other embodiments where a base station performs cell handover decision according to a measurement amount obtained by an UE according to embodiments of the present invention. Firstly, reference is made to FIG. 11.

Step 1101, the UE executes measurement, in addition to an RSRP and RSRQ, an SINR or an SNR also needs to be measured. In the following, the SINR is still taken as an example.

Step 1102, the UE determines, through the RSRP or the RSRQ, whether an event is triggered, and may also determine, through the SINR/SNR, whether the event is triggered. If it is determined that A3 is triggered, a measurement amount, for example, the SINR, is reported to an eNB. When the UE reports the A3 event, in addition to reporting an RSRP or RSRQ of a serving cell and an RSRP or RSRQ of a neighboring cell, the UE further needs to report a measured SINR/SNR of the serving cell and an SINR/SNR of the target cell.

Step 1103: The eNB determines, according to the A3 event reported by the UE, channel quality of the serving cell, for example, the SINR (SINK_s): if the channel quality of the serving cell is better than TH2. TH2 is set by the serving cell, so as to ensure the channel quality when the handover command may be correctly delivered, for example, the SINR.

If it is satisfied that SINR_s is greater than TH2, execute step 1104, otherwise, execute step 1106.

Step 1104: Determine whether SINR_n of the target cell satisfies that SINR_n is greater than TH3, where TH3 may be used to indicate the channel quality (for example, the SINR, and if the SNR is used for performing the comparison, the channel quality may be the SNR) required by an up link when the target cell may correctly obtain uplink grant (UL grant). If it is satisfied that SINR_n is greater than TH3, execute step 1105. If no, turn to step 1107.

Step 1105: The eNB delivers a cell handover command to the UE, and then the UE executes handover.

Step 1106: If SINR_s is smaller than or equal to TH2, PRB information used by the serving cell for the handover command is sent to the neighboring cell, so as to enable the neighboring cell to not use the PRB for performing sending (or lower a sending power of the neighboring cell on the PRB), so as to ensure that the handover command is correctly delivered, turn to step 1105, and notify the UE of executing the handover.

Step 1107: When the channel quality of the target cell is smaller than or equal to a third threshold TH3, for example, SINR_n is smaller than or equal to TH3, here, an SINR of a down link transmitting random access response (RA-response) signaling may be relatively low, so that during the handover process, the RA-response signaling may be lost, thereby resulting in the handover failure. By reporting position information of the UE, the target base station performs beam forming through the position of the UE. If a positioning accuracy is not high, by reporting position information of a power low node in handover request signaling, the beam forming is performed. For example, coordinate information of the UE and/or PMI information needs to be transferred. It may be known from FIG. 12 that it is different from FIG. 11 that in step 1106, after the eNB performs the interference coordination, turn to 1104.

Similarly, the newly added measurement amount, for example, the SINR or the SNR, is introduced, so that as long as the channel quality when the handover command is ensured to be correctly delivered is reached, the handover command is delivered, so as to improve a handover success rate.

Figure 13:
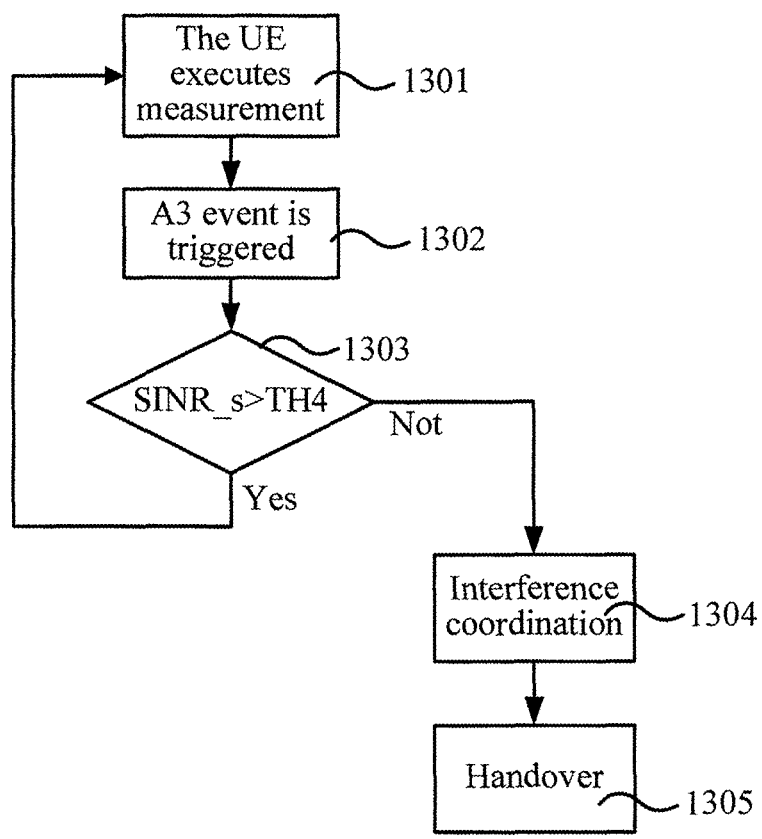
FIG. 13 is a flowchart where a base station performs cell handover decision according to a newly added measurement amount according to an embodiment of the present invention.

In addition, in order to effectively lower times of ping-pong handover, an embodiment as shown in FIG. 13 where a base station performs cell handover decision according to a measurement amount obtained by an UE according to embodiments of the present invention.

Step 1301: The UE executes measurement, in addition to an RSRP and RSRQ, an SINR or an SNR also needs to be measured. In the following, the SINR is taken as an example for illustration.

Step 1302: The UE determines, through the RSRP or the RSRQ, whether an event is triggered, and may also determine, through the SINR/SNR, whether the event is triggered. If it is determined that A3 is triggered, a measurement amount is reported to an eNB. When the UE reports the A3 event, in addition to reporting an RSRP or RSRQ of a serving cell and an RSRP or RSRQ of a neighboring cell, the UE further needs to report a measured SINR/SNR of the serving cell and an SINR/SNR of the target cell.

Step 1303: The eNB determines, according to the A3 event reported by the UE, channel quality of the serving cell, for example, the SINR (SINK_s): if the channel quality of the serving cell is better than a fourth threshold (TH4), that is, SINR_3 is greater than TH4, the eNB determines that the quality of the serving cell is still good, and decides to not enable the UE to execute handover, but enable the UE to reside in the original cell to continue executing the measurement. For example, the threshold TH4 may be used to indicate that the quality of the serving cell may still satisfy the channel quality of the UE performance demand (for example, SINR).

Step 1304: If the channel quality of the serving cell is lower than the threshold TH4, that is, SINR_s is smaller than or equal to TH4, interference coordination is executed. For example, PRB information used by the serving cell for the handover command is sent to the neighboring cell, so as to enable the neighboring cell to not use the PRB for performing sending (or lower a sending power of the neighboring cell on the PRB), so as to ensure that the handover command is correctly delivered, turn to step 1305.

Step 1305: The eNB notifies the UE of executing the handover.

It may be known from the above that the newly added measurement amount SINR or SNR may be used as a handover assisting decision condition, so as to improve a handover success rate, and meanwhile lower ping-pong handover.

Figure 14:
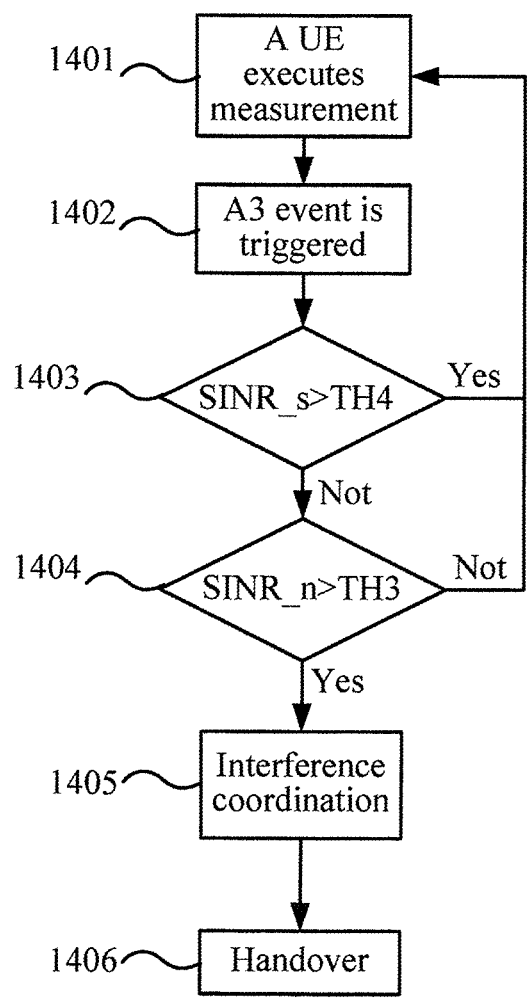
FIG. 14 is a flowchart where a base station performs cell handover decision according to a newly added measurement amount according to an embodiment of the present invention.

In addition, FIG. 14 shows another embodiment where a base station performs cell handover decision according to a measurement amount obtained by an UE according to an embodiment of the present invention.

Step 1401: The UE executes measurement, in addition to an RSRP and RSRQ, an SINR or an SNR also needs to be measured. In the following, the SINR is taken as an example for illustration.

Step 1402: The UE determines, through the RSRP or the RSRQ, whether an event is triggered, and may also determine, through the SINR/SNR, whether the event is triggered. If it is determined that A3 is triggered, a measurement amount is reported to an eNB. When the UE reports the A3 event, in addition to reporting an RSRP or RSRQ of a serving cell and an RSRP or RSRQ of a neighboring cell, the UE further needs to report a measured SINR of the serving cell and an SINR of the target cell.

Step 1403: The eNB determines, according to the A3 event reported by the UE, channel quality of the serving cell, for example, the SINR (SINR_s) of the serving cell: if the channel quality of the serving cell is better than TH4, that is, SINR_s is greater than TH4, the eNB determines that the quality of the serving cell is still good, and decides to not enable the UE to execute handover, but enable the UE to reside in the original cell to continue executing the measurement. For example, the threshold TH4 indicates that the quality of the serving cell may still satisfy the SINR of the UE performance demand. Otherwise, turn to step 1404.

Step 1404: After the SINR of the serving cell is considered, the SINR of the neighboring cell is further considered. It is determined whether SINR_n of the target cell satisfies that SINR_n is greater than TH3, in which TH3 is a pre-estimated SINR required by a down link when the target cell may correctly obtain downlink grant (DL grant) for the UE. If it is satisfied that SINK_n is greater than TH3, execute step 1405. If no, turn to step 1401.

Step 1405: Execute the interference coordination. For example, PRB information used by the serving cell for the handover command is sent to the neighboring cell, so as to enable the neighboring cell to not use the PRB for performing sending (or lower a sending power of the neighboring cell on the PRB), so as to ensure that the handover command is correctly delivered, turn to step 1305.

Step 1405: The eNB notifies the UE of executing the handover.

It may be known from the above that the newly added measurement amount SINR or SNR may be used as a handover assisting decision condition, so as to improve a handover success rate, and meanwhile lower ping-pong handover.

Figure 15:
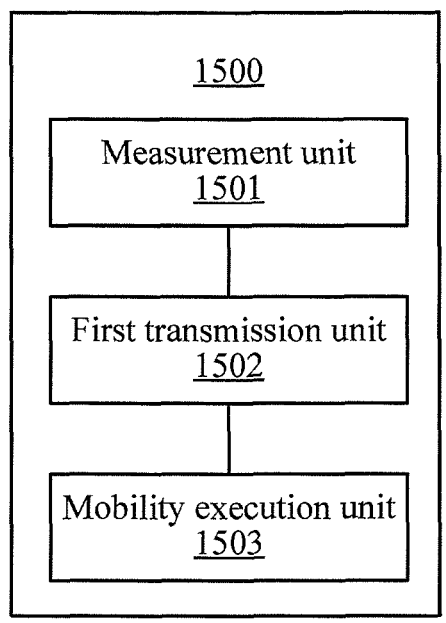
FIG. 15 is a schematic structural diagram of an apparatus for enhancing measurement in a wireless communication system according to an embodiment of the present invention.

In the following, referring to FIG. 15 to FIG. 17, an apparatus for enhancing measurement in a wireless communication system according to an embodiment of the present invention is described.

The apparatus for enhancing measurement in a wireless communication system 1500 includes a measurement unit 1501, a first transmission unit 1502, and a mobility execution unit 1503. The measurement unit 1501 is configured to obtain, according to a measurement period or triggered by an event, a measurement amount, where the measurement amount includes a ratio of a valid signal based on a reference signal to a non-valid signal based on the reference signal measured based on the reference signal, for example, a signal to interference plus noise ratio or a signal to noise ratio measured based on the reference signal. The first transmission unit 1502 is configured to report the measurement amount to a base station. The mobility execution unit 1503 is configured to perform cell selection or cell reselection according to the measurement amount. The reference signal includes a cell-specific reference signal CRS, a channel-state information reference signal CSI-RS, or a positioning reference signal PRS. Accordingly, the newly added measurement amount includes a channel quality index signal to interference plus noise ratio CQI SINR measured based on the CRS or the CSI-RS, and the CQI SINR is used to indicate channel quality. The measurement amount further includes a reference signal received power RSRP or reference signal received quality RSRQ based on the CSI-RS.

For example, the signal to interference plus noise ratio measured based on the reference signal is $$SINR = \frac{S}{INTF + \text{NOISE}}$$

or the signal to noise ratio measured based on the reference signal is $$SINR = \frac{S}{\text{NOISE}},$$

S is the valid signal based on the reference signal, INTF is an interference signal based on the reference signal, and NOISE is a noise signal based on the reference signal.

The signal to interference plus noise ratio $$SINR = \frac{S}{INTF + \text{NOISE}}$$

measured based on the reference signal is taken as an example, a signal to interference plus noise ratio measured on a resource element RE including the reference signal is $$SINR = \frac{RSRP}{Intf_1 + noise_1};$$

or a signal to interference plus noise ratio measured on an orthogonal frequency division multiplexing OFDM symbol including the reference signal is $$SINR = \frac{RSRP}{Intf_2 + noise_2};$$

or a signal to interference plus noise ratio measured on a resource block RB including the reference signal in a measurement bandwidth is $$SINR = \frac{N * RSRP}{\sum_{RB=1}^{N} Intf_3 + noise_3};$$

where RSRP is a valid signal on the RE including the reference signal, Intf1 is an interference signal on the RE including the reference signal, noise1 is a noise signal on the RE including the reference signal, Intf2 is an interference signal received on the OFDM symbol including the reference signal in the measurement bandwidth, noise2 is a noise signal received on the OFDM symbol including the reference signal in the measurement bandwidth, Intf3 is an interference signal received on the resource block including the reference signal in the measurement bandwidth, noise3 is a noise signal received on the resource block including the reference signal in the measurement bandwidth, and N is the number of resource blocks occupied by the measurement bandwidth.

Optionally, the first transmission unit 1502 is specifically configured to, after being triggered by an event corresponding to the measurement or after being triggered by the measurement period corresponding to the measurement, send a message carrying the measurement amount to the base station.

Optionally, the first transmission unit 1502 is specifically configured to, before the measurement amount is obtained according to the measurement period or triggered by the event, receive a message carrying measurement configuration and sent by the base station. The measurement configuration includes one or more pieces of the following formation: reporting configuration information, a filtering coefficient, a measurement bandwidth, a measurement frequency range, or a measurement period.

If the measurement configuration includes the measurement bandwidth and/or the measurement frequency range, the measurement unit 1501 is specifically configured to obtain, according to the measurement period, the measurement amount on the measurement bandwidth and/or the measurement frequency range.

The measurement period is a measurement period associated with one or more of measurement accuracy, power consumption of a user equipment, and a reference signal periodicity, for example, a variable measurement period.

Figure 16:
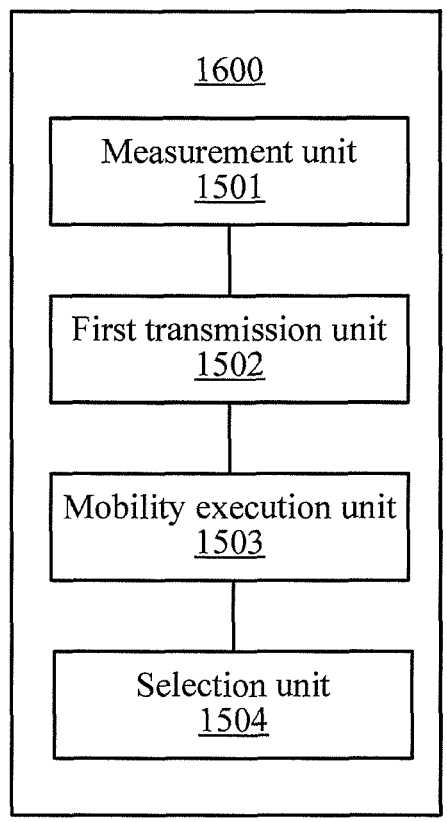
FIG. 16 is a schematic structural diagram of an apparatus for enhancing measurement in a wireless communication system according to an embodiment of the present invention.

FIG. 16 describes an apparatus for enhancing measurement in a wireless communication system according to an embodiment of the present invention.

The apparatus for enhancing measurement in a wireless communication system further 1600 includes a selection unit 1504. The selection unit 1504 is configured to, if the measurement configuration does not include the measurement bandwidth and the measurement frequency range, select the measurement bandwidth and/or the measurement frequency range; so that the measurement unit 1501 obtains, according to the measurement period, the measurement amount on the measurement bandwidth and/or the measurement frequency range.

Optionally, the first transmission unit 1502 is further configured to, after reporting the measurement amount to the base station, receive a handover command sent by the base station.

Optionally, the mobility execution unit 1503 is configured to perform handover from a serving cell to a target cell according to the handover command.

In the following, in combination with FIG. 17, an apparatus for enhancing measurement in a wireless communication system according to an embodiment of the present invention is described.

Figure 17:
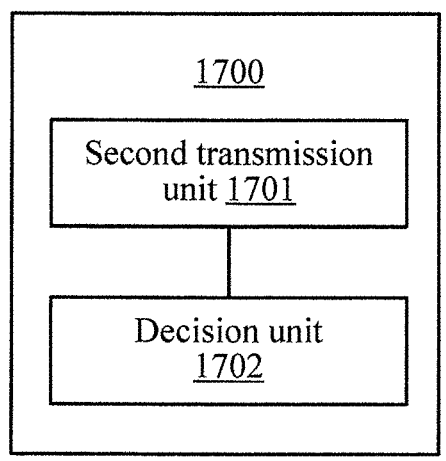
FIG. 17 is a schematic structural diagram of an apparatus for enhancing measurement in a wireless communication system according to an embodiment of the present invention.

In FIG. 17, the apparatus for enhancing measurement in a wireless communication system 1700 includes a second transmission unit 1701 and a decision unit 1702. The second transmission unit 1701 is configured to receive a measurement amount reported by a UE, where the measurement amount includes a ratio of a valid signal based on a reference signal to a non-valid signal based on the reference signal measured based on the reference signal, for example, a signal to interference plus noise ratio or a signal to noise ratio measured based on the reference signal. The decision unit 1702 is configured to perform inter-cell interference coordination or cell handover decision according to the measurement amount. The reference signal includes a cell-specific reference signal CRS, a channel-state information reference signal CSI-RS, or a positioning reference signal PRS.

Specifically, the second transmission unit 1701 is configured to, before receiving the measurement amount reported by the UE, send a message carrying measurement configuration to the UE. The measurement configuration includes one or more pieces of the following information: reporting configuration information, a filtering coefficient, a measurement bandwidth, a measurement frequency range, or a measurement period.

Optionally, if the measurement configuration includes the measurement bandwidth and/or the measurement frequency range, the second transmission unit 1701 is specifically configured to receive the measurement amount of the UE on the measurement bandwidth and/or the measurement frequency range.

Optionally, if the measurement configuration does not include the measurement bandwidth and the measurement frequency range, the second transmission unit 1701 is specifically configured to receive the measurement amount of the UE on the measurement bandwidth and/or the measurement frequency range selected by the UE.

As described above, the measurement period is a variable measurement period associated with one or more of measurement accuracy, power consumption of a user equipment, and a reference signal periodicity.

Specifically, the decision unit 1702 is specifically configured to compare a signal to interference plus noise ratio or a signal to noise ratio of a serving cell with a first threshold, if the signal to interference plus noise ratio or the signal to noise ratio of the serving cell is smaller than the first threshold, determine that the UE is an edge user, so as to lower a sending power for the UE and/or assign a corresponding edge spectrum resource, and if the signal to interference plus noise ratio or the signal to noise ratio of the serving cell is greater than or equal to the first threshold, determine that the UE is a center user, so as to lower the sending power for the UE and/or assign a corresponding center spectrum resource.

Alternatively, the decision unit 1702 is specifically configured to compare the signal to interference plus noise ratio or the signal to noise ratio of the serving cell with a second threshold; if the signal to interference plus noise ratio or the signal to noise ratio of the serving cell is smaller than or equal to the second threshold, perform the interference coordination, and send a handover command to the UE, where the second threshold is channel quality when the handover command is correctly delivered set for the serving cell; if the signal to interference plus noise ratio or the signal to noise ratio of the serving cell is greater than the second threshold, send the handover command to the UE; and if the signal to interference plus noise ratio or the signal to noise ratio of the serving cell is smaller than or equal to the second threshold, perform the interference coordination.

Optionally, the decision unit 1702 is further configured to: after performing the interference coordination, send the handover command to the UE; or compare the signal to interference plus noise ratio or the signal to noise ratio of the serving cell with a third threshold.

Optionally, the decision unit 1702 is specifically configured to, if the signal to interference plus noise ratio or the signal to noise ratio of the serving cell is greater than the second threshold, compare a signal to interference plus noise ratio or a signal to noise ratio of a target cell with a third threshold, and if the signal to interference plus noise ratio or the signal to noise ratio of the target cell is greater than the third threshold, send the handover command to the UE.

Optionally, the decision unit is further configured to, if the signal to interference plus noise ratio or the signal to noise ratio of the target cell is smaller than or equal to the third threshold, wait for the UE to report the obtained measurement amount again, or perforin beam forming by using precoding matrix indicator PMI information of the target cell, so as to send the handover command to the UE.

As described above, the interference coordination refers to that PRB information used by the serving cell for the handover command is sent to a base station of the target cell, so that the base station of the target cell does not use the PRB, or a sending power of the base station of the target cell on the PRB is lowered.

In another embodiment, the decision unit 1702 is specifically configured to compare the signal to interference plus noise ratio or the signal to noise ratio of the serving cell with a fourth threshold; if the signal to interference plus noise ratio or the signal to noise ratio of the serving cell is smaller than or equal to the fourth threshold, perform the interference coordination, and send a handover command to the UE, where the fourth threshold cannot be lower than the channel quality when the handover command is ensured to be correctly delivered set for the serving cell; and if the signal to interference plus noise ratio or the signal to noise ratio of the serving cell is greater than the fourth threshold, wait for the UE to report the obtained measurement amount again.

Optionally, the decision unit 1702 is further configured to, if the signal to interference plus noise ratio or the signal to noise ratio of the serving cell is smaller than or equal to the fourth threshold, compare a signal to interference plus noise ratio or a signal to noise ratio of a target cell with a third threshold, and if the signal to interference plus noise ratio or the signal to noise ratio of the target cell is greater than the third threshold, perform the interference coordination, and send the handover command to the UE.

Optionally, the decision unit 1702 is further configured to, if the signal to interference plus noise ratio or the signal to noise ratio of the target cell is smaller than or equal to the third threshold, wait for the UE to report the obtained measurement amount again.

Through the newly added measurement amount SINR or SNR, the UE may be assisted in performing the cell selection or the cell reselection. The UE sends the newly added measurement amount to the base station, so as to assist the base station in performing handover decision and interference coordination, thereby improving network communication performance.

It should be understood that the apparatus for enhancing measurement in a wireless communication system 1500 or 1600 may be configured on a UE side, and the apparatus for enhancing measurement in a wireless communication system 1700 may be configured on an eNB side.

It should be understood that the solution described by each claim of the present invention may be considered as an embodiment, and characteristics in the claims may be combined, for example, different branch steps executed after a determination step in the present invention may be used as different embodiments.

Persons of ordinary skill in the art may know that the units and the algorithm steps of each example described in combination with the embodiments disclosed in the specification may be implemented through electronic hardware, or the combination of computer software and electronic hardware. Whether these functions are executed as hardware or software depends upon the particular application and design constraint conditions of the technical solution. Persons skilled in the art can use different methods to implement the described functions for each particular application, but it should not be considered that the implementation goes beyond the scope of the present invention.

It can be clearly understood by persons skilled in the art that, for the purpose of convenient and brief description, for a detailed working process of the foregoing system, apparatus and unit, reference may be made to the corresponding process in the method embodiments, and the details will not be described herein again.

In several embodiments provided in the present application, it should be understood that the disclosed system, apparatus, and method may be implemented in other ways. For example, the described apparatus embodiments are merely exemplary. For example, the unit division is merely logical function division and can be other division in actual implementation. For example, multiple units or components can be combined or integrated into another system, or some features can be ignored or not performed. Furthermore, the shown or discussed coupling or direct coupling or communication connection may be accomplished through some interfaces, and indirect coupling or communication connection between apparatuses or units may be electrical, mechanical, or in other forms.

Units described as separate components may be or may not be physically separated. Components shown as units may be or may not be physical units, that is, may be integrated or distributed to a plurality of network units. Some or all of the modules may be selected to achieve the objective of the solution of the embodiment according to actual demands.

In addition, various functional units according to each embodiment of the present invention may be integrated in one processing module or may exist as various separate physical units, or two or more units may also be integrated in one unit.

When the function is implemented in the form of the software functional module and sold or used as a separate product, the function may be stored in a computer readable storage medium. Therefore, the technical solution of the present invention or the part that makes contributions to the prior art can be substantially embodied in the form of a software product. The computer software product is stored in a storage medium, and contains several instructions to instruct computer equipment (such as, a personal computer, a server, or network equipment) to perform all or a part of steps of the method as described in the embodiments of the present invention. The storage medium includes various media capable of storing program codes, such as, a flash disk, a mobile hard disk, a read-only memory (ROM, Read-Only Memory), a random access memory (RAM, Random Access Memory), a magnetic disk or an optical disk.

The foregoing descriptions are merely specific embodiments of the present invention, but the protection scope of the present invention is not limited thereto. Any modification or replacement easily figured out by persons skilled in the art within the technical scope disclosed in the present invention shall fall within the protection scope of the present invention. Therefore, the protection scope of the present invention is subject to the appended claims.

What is claimed is:

1. A method for enhancing measurement in a wireless communication system, the method comprising:
   obtaining by a user equipment in communication with the wireless communication system, according to a measurement period or triggered by an event, a measurement amount,
   wherein the measurement amount comprises a signal to interference plus noise ratio (SINR) based on a reference signal, wherein the SINR comprises:
   a signal to interference plus noise ratio being $$SINR = \frac{RSRP}{Intf_1 + noise_1}$$

measured on a resource element RE comprising the reference signal; or
   a signal to interference plus noise ratio being $$SINR = \frac{RSRP}{Intf_2 + noise_2}$$

measured on an orthogonal frequency division multiplexing OFDM symbol comprising the reference signal; or
   a signal to interference plus noise ratio being $$SINR = \frac{N * RSRP}{\sum_{RB=1}^{N} Intf_3 + noise_3}$$

measured on a resource block RB comprising the reference signal in a measurement bandwidth;
   wherein RSRP is a valid signal on the RE comprising the reference signal, $Intf_1$ is an interference signal on the RE comprising the reference signal, $noise_1$ is a noise signal on the RE comprising the reference signal, $Intf_2$ is an interference signal received on the OFDM symbol comprising the reference signal in a measurement bandwidth, $noise_2$ is a noise signal received on the OFDM symbol comprising the reference signal in the measurement bandwidth, $Intf_3$ is an interference signal received on the resource block comprising the reference signal in the measurement bandwidth, $noise_3$ is a noise signal received on the resource block comprising the reference signal in the measurement bandwidth, and N is a number of resource blocks occupied by the measurement bandwidth; and
   reporting the measurement amount to a base station by the user equipment; or
   performing cell selection or cell reselection according to the measurement amount by the user equipment.

2. The method according to claim 1, wherein before the obtaining, according to the measurement period or triggered by the event, a measurement mount, the method further comprises:
receiving a message carrying measurement configuration and sent by the base station, and performing measurement configuration according to the message, wherein the measurement configuration comprises one or more pieces of the following information: reporting configuration information, a filtering coefficient, a measurement bandwidth, a measurement frequency range, or a measurement period.

3. The method according to claim 2, wherein if the measurement configuration does not comprise the measurement bandwidth and the measurement frequency range, the obtaining, according to the measurement period, the measurement amount, comprises:
selecting a measurement bandwidth and/or a measurement frequency range;
obtaining, according to the measurement period, the measurement amount on the selected measurement bandwidth and/or the selected measurement frequency range.

4. The method according to claim 1, wherein the measurement period is a measurement period associated with one or more of measurement accuracy, power consumption of the user equipment, and a reference signal periodicity.

5. The method according to claim 1, wherein the measurement amount is reported to the base station and the base station thereafter performs an inter-cell interference coordination according to the measurement amount.

6. The method according to claim 1, wherein the measurement amount is reported to the base station and the base station thereafter makes a cell handover decision according to the measurement amount.

7. The method according to claim 1, wherein the event is one of:
an event A1, wherein a serving cell of the user equipment is better than an absolute threshold;
an event A2, wherein the serving cell of the user equipment is worse than an the absolute threshold;
an event A3, wherein a neighboring cell for the user equipment is an offset value better than a primary cell for the user equipment, wherein the primary cell is based on carrier aggregation;
an event A4, wherein the neighboring cell for the user equipment is better than an absolute threshold;
an event A5, wherein the primary cell for the user equipment is smaller than an absolute threshold, and the neighboring cell for the user equipment is greater than another absolute threshold; and
an event A6, wherein the neighboring cell for the user equipment is an offset value better than a supplementary cell, wherein the supplementary cell is based on the carrier aggregation.

8. The method according to claim 1, wherein the event is one of:
an event B1, wherein an inter radio access technology (RAT) neighboring cell for the user equipment is better than a threshold; and
an event B2, wherein a serving cell for the user equipment is lower than a first threshold and the inter RAT neighboring cell is better than a second threshold.

9. The method according to claim 1, wherein the measurement amount includes a measurement amount of the event.

10. The method according to claim 1, wherein the measurement amount confirms to a measurement accuracy that includes one or more of an intra-frequency absolute accuracy, an intra-frequency relative accuracy, an inter-frequency absolute accuracy, and an inter-frequency relative accuracy.

11. An apparatus for enhancing measurement in a wireless communication system, the apparatus comprising:
a measurement unit implemented by one or more processors, the measurement unit configured to obtain, according to a measurement period or triggered by an event, a measurement amount, wherein the measurement amount comprises a signal to interference plus noise ratio (SINR) based on a reference signal, wherein the SINR comprises:
a signal to interference plus noise ratio being $$SINR = \frac{RSRP}{Intf_1 + noise_1}$$

measured on a resource element RE comprising the reference signal; or
a signal to interference plus noise ratio being $$SINR = \frac{RSRP}{Intf_2 + noise_2}$$

measured on an orthogonal frequency division multiplexing OFDM symbol comprising the reference signal; or
a signal to interference plus noise ratio being $$SINR = \frac{N * RSRP}{\sum_{RB=1}^{N} Intf_3 + noise_3}$$

measured on a resource block RB comprising the reference signal in a measurement bandwidth;
wherein RSRP is a valid signal on the RE comprising the reference signal, $Intf_1$ is an interference signal on the RE comprising the reference signal, $noise_1$ is a noise signal on the RE comprising the reference signal, $Intf_2$ is an interference signal received on the OFDM symbol comprising the reference signal in a measurement bandwidth, $noise_2$ is a noise signal received on the OFDM symbol comprising the reference signal in the measurement bandwidth, $Intf_3$ is an interference signal received on the resource block comprising the reference signal in the measurement bandwidth, $noise_3$ is a noise signal received on the resource block comprising the reference signal in the measurement bandwidth, and N is a number of resource blocks occupied by the measurement bandwidth;
a first transmission unit implemented by the one or more processors, the first transmission unit configured to report the measurement amount to a base station; and
a mobility execution unit implemented by the one or more processors, the mobility configuration unit configured to perform cell selection or cell reselection according to the measurement amount.

12. The apparatus according to claim 11, wherein the first transmission unit is configured to, before the measurement result is obtained according to the measurement period or triggered by the event, receive a message carrying the measurement configuration and sent by the base station, and perform measurement configuration according to the message, wherein the measurement configuration comprises one or more pieces of the following information: reporting configuration information, a filtering coefficient, a measurement bandwidth, a measurement frequency range, or a measurement period.

13. The apparatus according to claim 12, further comprising a selection unit, configured to, if the measurement configuration does not comprise the measurement bandwidth and the measurement frequency range, select a measurement bandwidth and/or a measurement frequency range; wherein the measurement unit obtains, according to the measurement period, the measurement amount on the selected measurement bandwidth and/or the selected measurement frequency range.

14. The apparatus according to claim 11, wherein the measurement period is a measurement period associated with one or more of a measurement accuracy, a power consumption of a user equipment, and a reference signal periodicity.

15. The apparatus according to claim 11, wherein the measurement amount is reported to the base station and the base station thereafter performs inter-cell interference coordination according to the measurement amount.

16. The apparatus according to claim 11, wherein the measurement amount is reported to the base station and the base station thereafter makes a cell handover decision according to the measurement amount.

17. The apparatus according to claim 11, wherein the event is one of:
    an event A1, wherein a serving cell of the apparatus is better than an absolute threshold;
    an event A2, wherein the serving cell of the apparatus is worse than an the absolute threshold;
    an event A3, wherein a neighboring cell for the apparatus is an offset value better than a primary cell for the apparatus, wherein the primary cell is based on carrier aggregation;
    an event A4, wherein the neighboring cell for the apparatus is better than an absolute threshold;
    an event A5, wherein the primary cell for the apparatus is smaller than an absolute threshold, and the neighboring cell for the apparatus is greater than another absolute threshold; and
    an event A6, wherein the neighboring cell for the apparatus is an offset value better than a supplementary cell, wherein the supplementary cell is based on the carrier aggregation.

18. The apparatus according to claim 11, wherein the event is one of:
    an event B1, wherein an inter radio access technology (RAT) neighboring cell for the apparatus is better than a threshold; and
    an event B2, wherein a serving cell for the apparatus is lower than a first threshold and the inter RAT neighboring cell is better than a second threshold.

19. The apparatus according to claim 11, wherein the measurement amount includes a measurement amount of the event.

20. The apparatus according to claim 11, wherein the measurement amount confirms to a measurement accuracy that includes one or more of an intra-frequency absolute accuracy, an intra-frequency relative accuracy, an inter-frequency absolute accuracy, and an inter-frequency relative accuracy.

* * * * *